(12) United States Patent
Asozu et al.

(10) Patent No.: US 10,168,583 B2
(45) Date of Patent: Jan. 1, 2019

(54) LIQUID CRYSTAL DISPLAY DEVICE

(71) Applicant: Japan Display Inc., Minato-ku (JP)

(72) Inventors: Genki Asozu, Tokyo (JP); Toshiyuki Higano, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/862,576

(22) Filed: Sep. 23, 2015

(65) Prior Publication Data

US 2016/0091764 A1 Mar. 31, 2016

(30) Foreign Application Priority Data

Sep. 30, 2014 (JP) ................................ 2014-201941

(51) Int. Cl.
*G02F 1/1333* (2006.01)
*G02F 1/1343* (2006.01)

(52) U.S. Cl.
CPC ................. *G02F 1/134309* (2013.01); *G02F 2001/133337* (2013.01); *G02F 2001/133388* (2013.01)

(58) Field of Classification Search
CPC ... G02F 1/134309; G02F 2001/134318; G02F 2001/133337
See application file for complete search history.

(56) References Cited

U.S. PATENT DOCUMENTS

| 2002/0033921 A1* | 3/2002 | Song ..................... G02F 1/1345 349/141 |
| 2002/0044246 A1* | 4/2002 | Moon ................... G02F 1/1345 349/141 |
| 2007/0296674 A1 | 12/2007 | Aoki et al. |
| 2009/0015533 A1* | 1/2009 | Fujita .................. G09G 3/3655 345/92 |

(Continued)

FOREIGN PATENT DOCUMENTS

| CN | 101650499 A | 2/2010 |
| CN | 101825817 A | 9/2010 |

(Continued)

OTHER PUBLICATIONS

Japanese Office Action dated Mar. 13, 2018 in Japanese Patent Application No. 2014-201941 (with English translation), 12 pages.

(Continued)

*Primary Examiner* — Michael Caley
*Assistant Examiner* — Jonathan Y Jung
(74) *Attorney, Agent, or Firm* — Oblon, McClelland, Maier & Neustadt, L.L.P.

(57) ABSTRACT

According to one embodiment, a liquid crystal display device includes an active-element substrate. The active-element substrate includes a display area, a non-display area, an image signal line, an active element including a scanning line and connected to the image signal line, a driving circuit, a common electrode, a first electrode electrically connected to the common electrode and provided in the non-display (Continued)

area, and a second electrode the voltage of which is lower than that of the common electrode, and which is provided in the non-display area. At least part of the second electrode is provided in a different position from that of the first electrode as seen in plan view. The scanning line is provided below the first electrode.

8 Claims, 35 Drawing Sheets

(56) References Cited

U.S. PATENT DOCUMENTS

| | | | | |
|---|---|---|---|---|
| 2013/0021657 | A1* | 1/2013 | Tomikawa | G02F 1/134309 |
| | | | | 359/245 |
| 2013/0128210 | A1* | 5/2013 | Nagasawa | G02F 1/13452 |
| | | | | 349/151 |
| 2014/0139796 | A1* | 5/2014 | Cao | G02F 1/136204 |
| | | | | 349/139 |
| 2014/0307190 | A1* | 10/2014 | Tomikawa | G02F 1/13306 |
| | | | | 349/33 |
| 2014/0368481 | A1* | 12/2014 | Tomikawa | G09G 3/3614 |
| | | | | 345/205 |

FOREIGN PATENT DOCUMENTS

| | | |
|---|---|---|
| CN | 102540566 A | 7/2012 |
| CN | 102692764 A | 9/2012 |
| CN | 102736326 A | 10/2012 |
| JP | 6-289408 A | 10/1994 |
| JP | 2008-026869 | 2/2008 |
| JP | 2010-26032 A | 2/2010 |
| JP | 2013-25066 A | 2/2013 |
| JP | 2013-109192 A | 6/2013 |

OTHER PUBLICATIONS

Chinese Office Action dated Feb. 2, 2018, issued in Chinese Patent Application No. 201510632095.3 (with English translation).

* cited by examiner

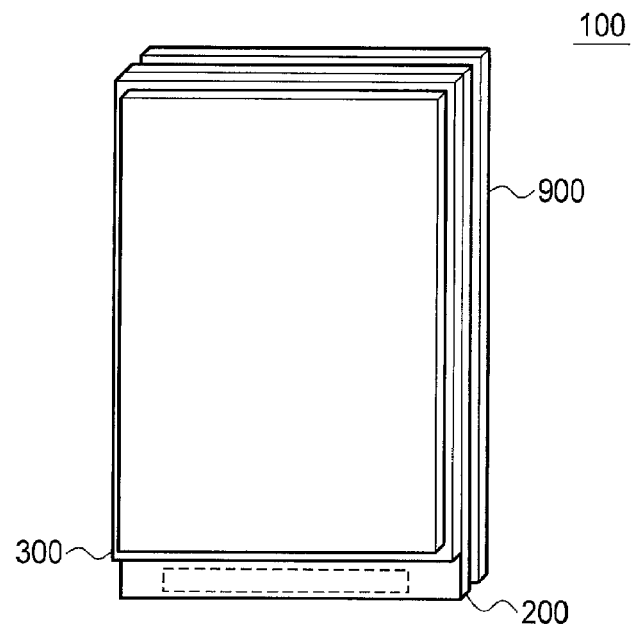
F I G. 1
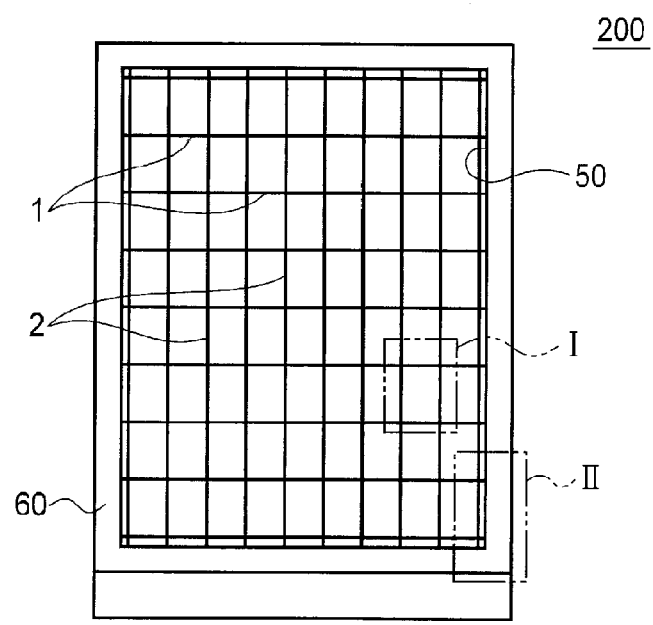
F I G. 2

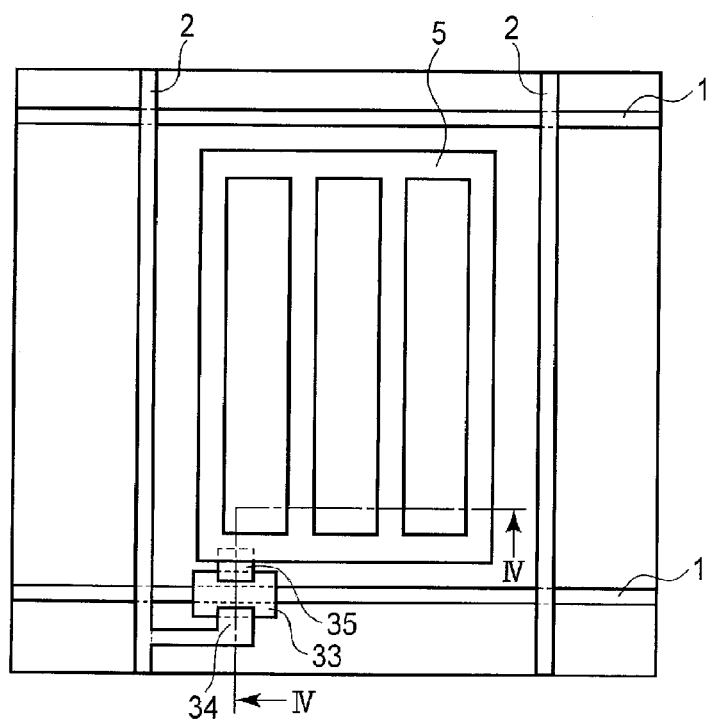
F I G. 3
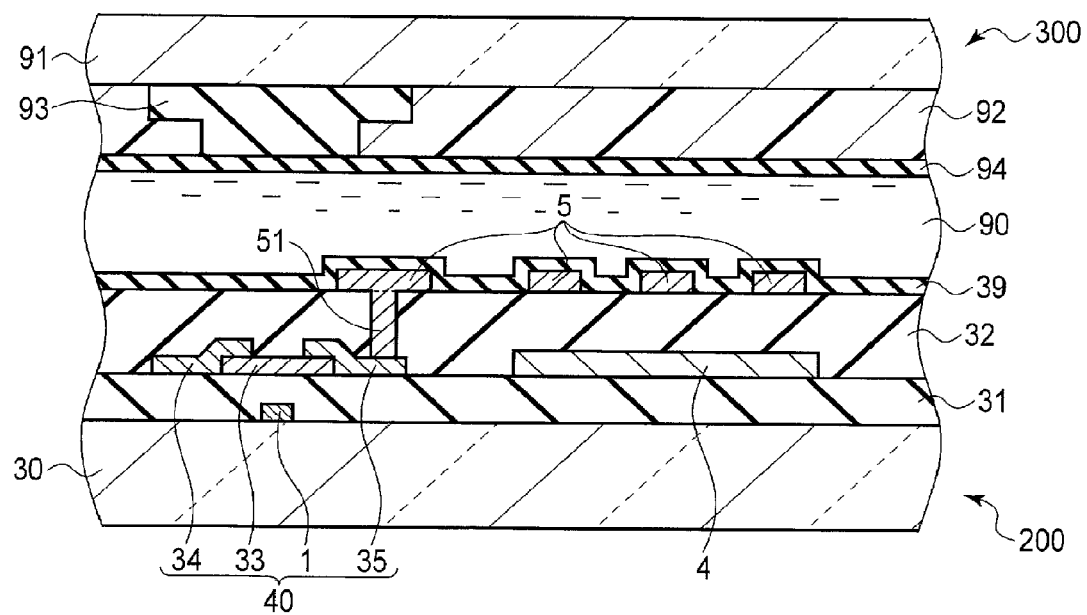
F I G. 4

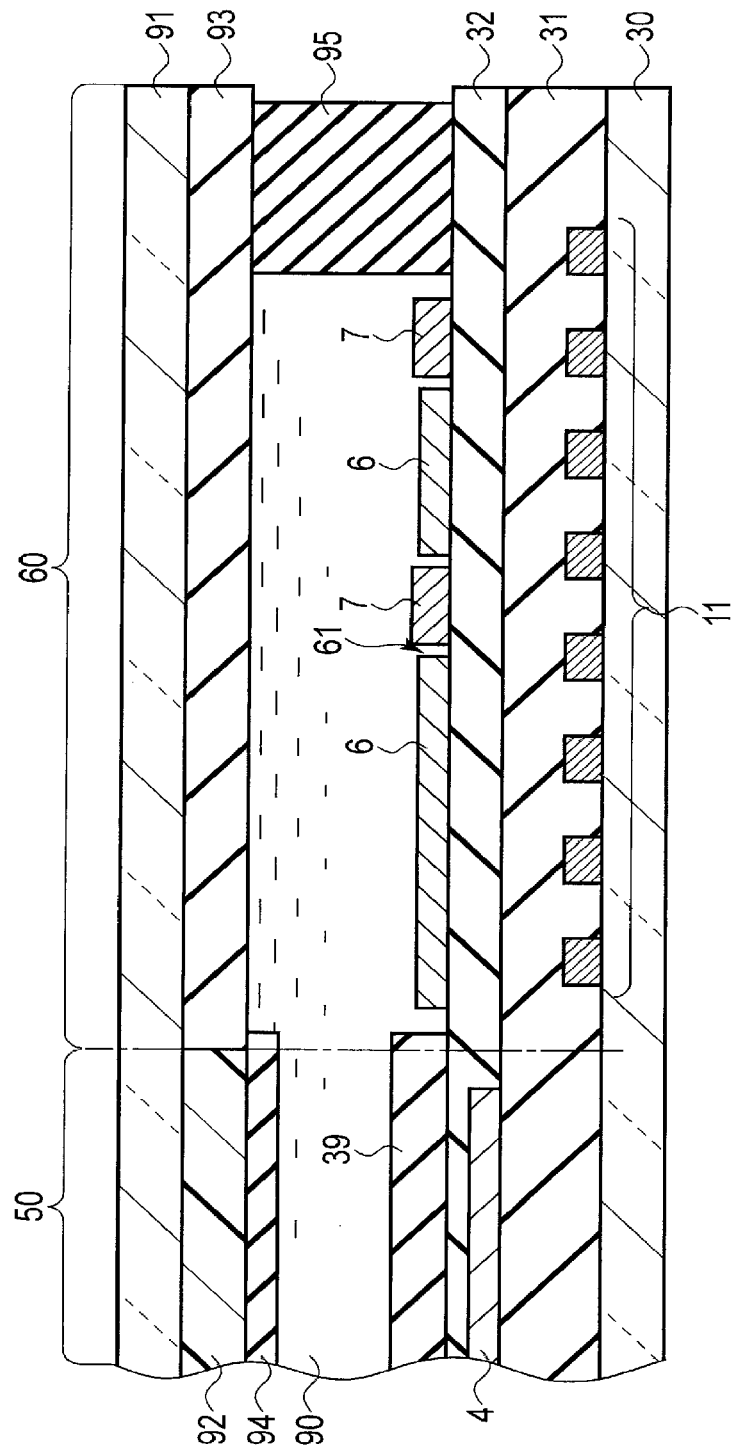
F I G. 24

LIQUID CRYSTAL DISPLAY DEVICE

CROSS-REFERENCE TO RELATED APPLICATIONS

This application is based upon and claims the benefit of priority from Japanese Patent Application No. 2014-201941, filed Sep. 30, 2014, the entire contents of which are incorporated herein by reference.

FIELD

Embodiments described herein relate generally to a liquid crystal display device.

BACKGROUND

In a liquid crystal display device adopting an IPS mode including an FFS mode, a driving circuit is provided on an active-element substrate which is one of two substrates holding a liquid crystal, the driving circuit being provided to apply a voltage to a scanning line and an image signal line. Thus, at the active-element substrate, scanning lines are provided over a display area and also extend to the outside thereof.

It should be noted that there is a case where ions generate which are charged by impurities from a liquid crystal, an alignment film and a sealing member, or impurities of water entering a liquid crystal display device from the outside thereof. Such ions reduce the voltage, and thus also reduce the brightness of the liquid crystal display device, to cause black unevenness in which unnecessary black appears in an image. Such ions collect in the vicinity of scanning lines located outside the display area due to an electric field generated by those scanning lines. However, in the case where a larger number of ions generate, they collect not only in the outside of the display area, but within the display area.

Jpn. Pat. Appln. KOKAI Publication No. 2008-26869 discloses a display device in which a shielding electrode is provided between a counter-substrate and a polarizer. In this display device, a shielding electrode is provided to hold ions remaining in a non-display area, in order to restrict collection of ions in the display area.

However, even if the liquid crystal display device is provided with a shielding electrode, it is hard to hold ions remaining in the outside of the display area. Inevitably, ions collect in the display area.

BRIEF DESCRIPTION OF THE DRAWINGS

FIG. 1 is a perspective view of a liquid crystal display device according to a first embodiment.

FIG. 2 is a plan view of an active-element substrate in the first embodiment.

FIG. 3 is another plan view of the active-element substrate in the first embodiment.

FIG. 4 is a cross-sectional view of the liquid crystal display device according to the first embodiment.

FIG. 24 is a cross-sectional view of a liquid crystal display device according to a seventeenth embodiment.

DETAILED DESCRIPTION

Figure 5:
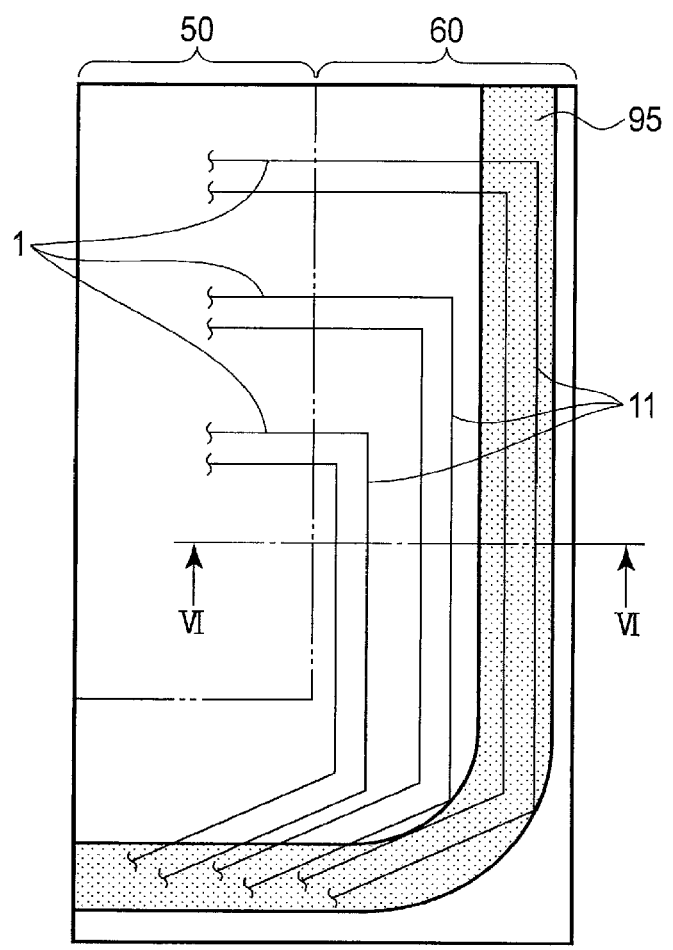
FIG. 5 is still another plan view of the active-element substrate in the first embodiment.

In general, according to one embodiment, there is provided a liquid crystal display device comprising an active-element substrate, a counter-substrate provided above and opposite to the active-element substrate and a liquid crystal provided between the active-element substrate and the counter-substrate. The active-element substrate includes: a display area in which an image is displayed; a non-display area in which no image is displayed; an image signal line; an active element including a scanning line and connected to the image signal line; a driving circuit which is connected to the scanning line and the image signal line, and applies a voltage; a common electrode; a first electrode electrically connected to the common electrode and provided in the non-display area; and a second electrode the voltage of which is lower than that of the common electrode, and which is provided in the non-display area. At least part of the second electrode is provided in a different position from that of the first electrode as seen from above. The scanning line is provided below the first electrode.

According to another embodiment, there is provided a liquid crystal display device including an active-element substrate, a counter-substrate provided above and opposite to the active-element substrate and a liquid crystal provided between the active-element substrate and the counter-substrate. The active-element substrate includes: a display area in which an image is displayed; a non-display area in which no image is displayed; an image signal line; an active element including a scanning line and connected to the image signal line; a driving circuit which is connected to the scanning line and the image signal line, and applies a voltage; a common electrode; and a first electrode electrically connected to the common electrode and provided in the non-display area. The scanning line is provided below the first electrode. A plurality of scanning lines identical to the above scanning line are provided, and one or more of the scanning lines are low-voltage scanning lines each having an hourly average voltage which is lower than the voltage of the common electrode. At least part of the low-voltage scanning line or lines is located in a different position from that of the first electrode as seen from above.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerers, and a detailed description thereof is omitted unless otherwise necessary.

<First Embodiment>

FIG. 1 is a perspective view of a liquid crystal display device 100 according to the first embodiment. The liquid crystal display device 100 includes an active-element substrate 200, a counter-substrate 300 and a backlight device 900.

The backlight device 900 includes a light-emitting unit such as a light-emitting diode (LED), and emits light from a side located outward of the active-element substrate 200 such that the light is transmitted through the active-element substrate 200 and the counter-substrate 300.

FIG. 2 is a plan view of the active-element substrate 200. FIG. 3 is another plan view of the active-element substrate 200. FIG. 4 is a cross-sectional view of the liquid crystal display device 100. To be more specific, FIG. 3 is an enlarged view of a region I shown in FIG. 2. FIG. 4 is a cross-sectional view taken along line IV-IV in FIG. 3.

In each of embodiments described herein, suppose a direction from the counter-substrate 300 toward the active-element substrate 200 is a downward direction, and a direction from the active-element substrate 200 toward the counter-substrate 300 is an upward direction. It should be noted that referring to FIG. 3, the backlight device 900 is lower in position than the active-element substrate 200. A liquid crystal 90 is provided between the active-element substrate 200 and the counter-substrate 300. If an object is seen from an upper position in the downward direction, the phrase "as seen in plan view" will be used.

The active-element substrate 200 comprises scanning lines 1, image signal lines 2, a common electrode 4, pixel electrodes 5, a transparent substrate 30, insulating layers 31 and 32, semiconductor layers 33, source electrodes 34, drain electrodes 35 and an alignment film 39.

The transparent substrate 30 is formed of glass, but may be formed of plastic. Also, the transparent substrate 30 is, for example, rectangular.

The scanning lines 1 are arranged at regular intervals in a single direction with respect to the active-element substrate 200. To be more specific, the single direction is a direction along, for example, short sides of the transparent substrate 30. The scanning lines 1 are provided on the transparent substrate 30. The scanning lines 1 are given a high gate voltage higher than the voltage of the common electrode 4 at the ON time, and given a low gate voltage lower than the voltage of the common electrode 4 at the OFF time.

The image signal lines 2 are arranged at regular intervals in another direction with respect to the active-element substrate 200. The other direction is a direction along, for example, long sides of the transparent substrate 30. As seen in plan view, the above single direction and other directions are perpendicular to each other, and the scanning lines 1 intersect the image signal lines 2. The scanning lines 1 and the image signal lines 2 may be partially bent. To the image signal lines 2, a voltage corresponding to an image to be displayed is applied.

The insulating layer 31 is provided on the transparent substrate 30 and the image signal lines 2. Between the transparent substrate 30 and a group of the image signal lines 2 and the insulating layer 31, undercoat film, insulating layer or the like may be provided.

The common electrode 4 is provided on the insulating layer 31. The common electrode 4 is provided over the entire display area 50. The common electrode 4 may be formed in the shape of a plate or a band. At the common electrode 4, the voltage is kept constant.

The semiconductor layers 33 are provided on the insulating layer 31. The semiconductor layer 33 is located above the scanning line 1, and as seen in plan view, is formed in the shape of a plate wider than the scanning line 1. The source electrode 34 is provided on the insulating layer 31, and is located on a one-end side of the semiconductor layer 33. The source electrode 34 is partially provided on the semiconductor layer 33. The drain electrode 35 is provided on the insulating layer 31, and is located on the other-end side of the semiconductor layer 33. The drain electrode 35 is partially provided on the semiconductor layer 33. The scanning line 1, the insulating layer 31, the semiconductor layer 33, the source electrode 34 and the drain electrode 35 function as a thin-film transistor which corresponds to active element 40.

The on/off state of an active element 40 is controlled in accordance with the voltage applied to a scanning line 1. In the on state, the active element 40 guides a voltage corresponding to an image signal transmitted from an image signal line 2 to a drain electrode 35 through a source electrode 34 and a semiconductor layer 33.

The insulating layer 32 is provided on the insulating layer 31, and covers the common electrode 4 and the active elements 40. It should be noted that the insulating layers 31 and 32 may be provided so as not to contact each other, and another insulating layer, a color filter or the like may be provided between the insulating layers 31 and 32.

The pixel electrodes 5 are provided on the insulating layer 32, and include slits formed in the shape of a plate. The pixel electrodes 5 may be formed in the shape of, for example, a band. Furthermore, the pixel electrode 5 includes connection portion 51. The connection portion 51 is projected downward, and electrically connected to the drain electrode 35. The pixel electrode 5 applies a voltage from the drain electrode 35 to the liquid crystal 90.

The alignment film 39 is formed of, for example, polyimide, and causes a group of molecules of the liquid crystal 90 to be aligned in a single direction.

The liquid crystal 90 is a nematic liquid crystal, and its alignment direction varies in accordance with the voltage applied.

The active-element substrate 200 includes the display area 50 and a non-display area 60. In the display area 50, a plurality of active elements 40 are provided. The active elements 40 control light emitted from the backlight device 900, thereby causing an image to be displayed in the display area 50. On the other hand, the non-display area 60 is an area in which no image is displayed.

The counter-substrate 300 comprises a transparent substrate 91, a color filter 92, a light-shielding portion 93 and an alignment film 94.

The transparent substrate 91 is formed of glass, but may be formed of plastic. The color filter 92 is provided under the transparent substrate 91, and permits light having a specific color to be transmitted through the color filter 92. The light-shielding portion 93 is provided under the transparent substrate 91. Furthermore, the light-shielding portion 93 is formed in the shape of a lattice, located above the scanning lines 1 and the image signal lines 2, and has a light blocking characteristic. The light-shielding portion 93 may be provided in the non-display area 60. The alignment film 94 causes a group of liquid crystal molecules of the liquid crystal 90 to be aligned in a single direction. It should be noted that in the case where a color filter is provided at the active-element substrate 200, neither the color filter 92 nor the light-shielding portion 93 need to be provided.

Figure 6:
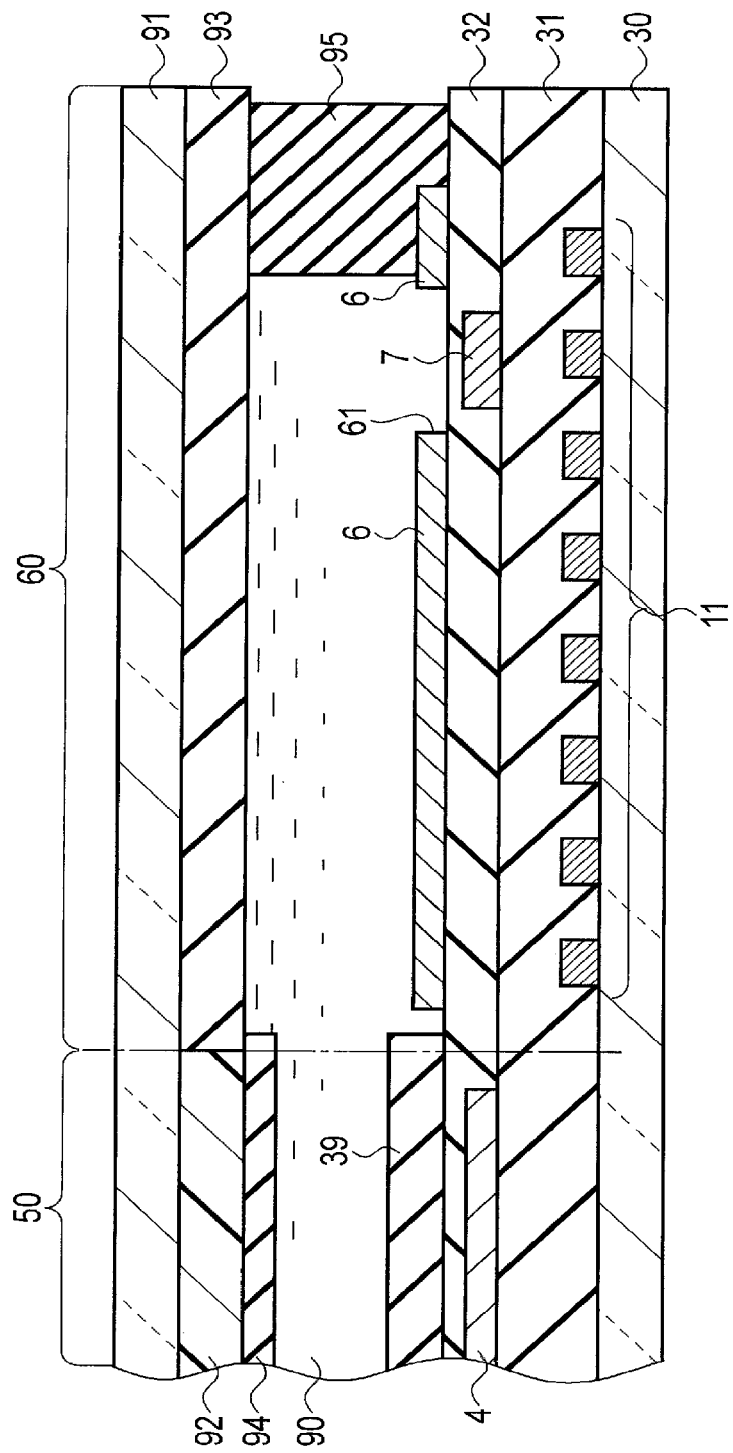
FIG. 6 is another cross-sectional view of the liquid crystal display device according to the first embodiment.

FIG. 5 is a still another plan view of the active-element substrate 200. FIG. 6 is another cross-sectional view of the liquid crystal display device 100. To be more specific, FIG. 5 is an enlarged view of a region II in FIG. 2. FIG. 6 is a cross-sectional view taken along line VI-VI in FIG. 5.

A sealing member 95 is provided along an outer peripheral edge of a shielding electrode 6 and a side thereof. The sealing member 95 is provided along an outer peripheral portion of the non-display area 60 to seal the liquid crystal 90.

Figure 7:
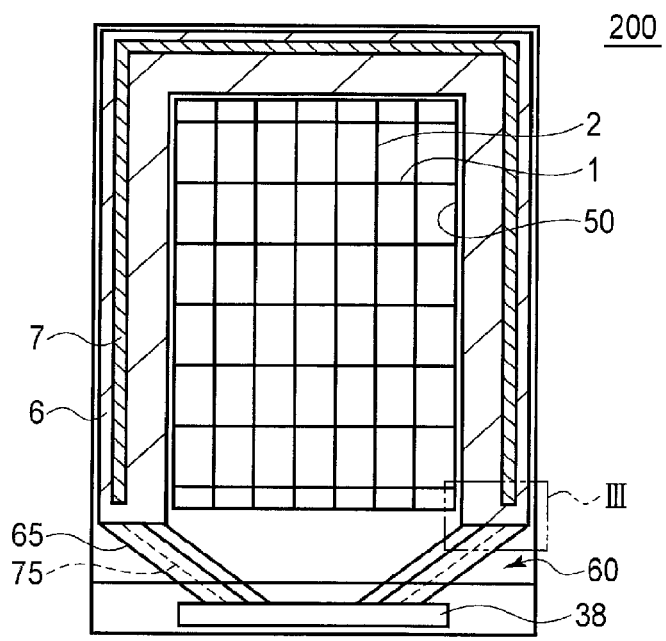
FIG. 7 is a further plan view of the active-element substrate in the first embodiment.
Figure 8:
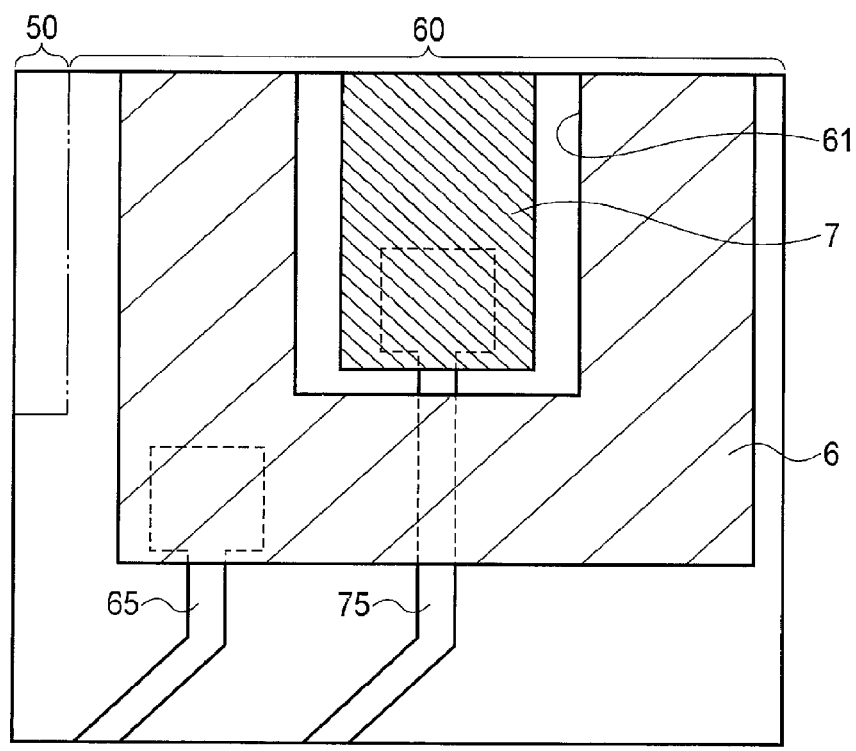
FIG. 8 is a still further plan view of the active-element substrate in the first embodiment.

FIG. 7 is a further plan view of the active-element substrate 200. FIG. 8 is a still further plan view of the active-element substrate 200. To be more specific, FIG. 8 is an enlarged view of a region III in FIG. 7.

The scanning lines 1 comprise a plurality of scanning lines 11 provided in the non-display area 60. To be more specific, half of the scanning lines 11 of the scanning lines 1 are located in part of the non-display area 60 which is located on one of opposite sides of the display area 50, and the other half of the scanning lines 11 are located in part of the non-display area 60 which is located on the other of the opposite sides of the display area 50.

The scanning lines 11 extend in the longitudinal direction of the scanning lines 1 in the display area 50, and are then bent to extend along the non-display area 60. They are also arranged at intervals in the non-display area 60. The distances between the scanning lines 11 are smaller than those between the scanning lines 1 in the display area 50. The scanning lines 11 are connected to a driving circuit 38. Some of the scanning lines 11 are partially located below the sealing member 95.

The image signal lines 2 comprise a plurality of image signal lines 21 located in the non-display area 60. The image signal lines 21 are bent in the non-display area 60, and connected to the driving circuit 38.

The driving circuit 38 is provided close to an end portion of the active-element substrate 200. The driving circuit 38 applies high and low gate voltages to the scanning lines 11. The driving circuit 38 applies a voltage corresponding to an image to be displayed to the image signal lines 21.

The insulating layer 31, the insulating layer 32 and the liquid crystal 90 are also located in the non-display area 60.

The shielding electrode 6 is provided on the insulating layer 32. That is, the shielding electrode 6 is provided in the same layer as the alignment film 39. The shielding electrode 6 is U-shaped along three sides of the non-display area 60 which are other than a side on which the driving circuit 38 is provided. Furthermore, the shielding electrode 6 is provided above the scanning lines 11. The shielding electrode 6 may be formed of a conductive material such as indium tin oxide (ITO) or conductive metal. The shielding electrode 6 is electrically connected to the common electrode 4 to have the same voltage as the common electrode 4.

Also, in the shielding electrode 6, a slit 61 is formed. As seen in plan view, the slit 61 is located outward of a center portion of the shielding electrode 6 in a width direction thereof. That is, part of the shielding electrode 6 which is located inward of the slit 61 has a greater width than a width of part of the shielding electrode 6 which is located outward of the slit 61. The slit 61 is also U-shaped in accordance with the shape of an outer periphery of the shielding electrode 6.

A conductive line 65 connects the driving circuit 38 and the shielding electrode 6. The conductive line 65 may be connected to the common electrode 4.

A trap electrode 7 is provided as a second electrode on the insulating layer 31 in the non-display area 60. That is, the trap electrode 7 is located in the same layer as the common electrode 4. As seen in plan view, the trap electrode 7 is also U-shaped along the three sides of the non-display area 60. The trap electrode 7 is located along the slit 61.

Also, the trap electrode 7 is located above the scanning lines 11. The trap electrode 7 may be formed of a transparent conductive film such as ITO or conductive metal.

In addition, the trap electrode 7 is located below the slit 61. That is, as seen in plan view, the trap electrode 7 is located in the slit 61 of the shielding electrode 6.

Also, as seen in plan view, at least portions of the shielding electrode 6 and trap electrode 7 do not overlap with each other. Furthermore, it is preferable that as seen in plan view, the entire shielding electrode 6 and trap electrode 7 be provided so as not to overlap with each other. Preferably, the width of the trap electrode 7 should be smaller than that of the slit 61. In such a manner, at least portions of the shielding electrode 6 and trap electrode 7 do not overlap with each other. Thus, the shielding electrode 6 blocks impurity ions, and the trap electrode 7 collects impurity ions; i.e., the shielding electrode 6 and the trap electrode 7 effectively fulfill respective functions. It should be noted that the shielding electrode 6 and the trap electrode 7 may be provided only on one of long sides of the display area 50 or on both the long sides thereof.

An inner edge portion of the shielding electrode 6 is located inward of the innermost one of the scanning lines 11. Also, an outer edge portion of the shielding electrode 6 is located outward of the outermost one of the scanning lines 11. The shielding electrode 6 is located below the sealing member 95.

A conductive line 75 connects the driving circuit 38 and the trap electrode 7. The driving circuit 38 applies, for example, a low gate voltage which is an off-state voltage of the active element 40 to the conductive line 75. The voltage of the trap electrode 7 is lower than that of the shielding electrode 6.

Ions charged by impurities or the like are positive ions. Therefore, the trap electrode 7 can collect ions because of a Coulomb force by causing the voltage of the trap electrode 7 to be lower than that of the common electrode 4.

In the first embodiment, in the non-display area 60, the shielding electrode 6 the voltage of which is the same as that of the common electrode 4 and the trap electrode 7 the voltage of which is lower than that of the common electrode 4 are provided. Thus, ions can be blocked and also collected in the non-display area 60.

Furthermore, the shielding electrode 6 is partially located below the sealing member 95. It is therefore possible to effectively block ions generated from the outside of the sealing member 95 or the liquid crystal display device 100.

Also, the shielding electrode 6 is provided on the insulating layer 32. That is, the shielding electrode 6 is located close to the liquid crystal 90. Thereby, the shielding electrode 6 can effectively block ions generated from the liquid crystal 90.

Furthermore, part of the shielding electrode 6 is located inward of the trap electrode 7. As a result, the trap electrode 7 can collect ions in a position away from the boundary between the display area 50 and the non-display area 60. It is therefore possible to effectively prevent ions from collecting in the display area 50.

Also, the shielding electrode 6 is provided in a layer above a layer in which the trap electrode 7 is provided. Thereby, the shielding electrode 6 can effectively block ions on its side-surface side in addition to ions on its upper-surface side.

In addition, the shielding electrode 6 is partially located in the same layer as the alignment film 39. As a result, the shielding electrode 6 can effectively block ions generated from the alignment film 39.

It should be noted that the number of shielding electrodes 6 is not limited to one. For example, shielding electrodes 6 may be provided inward and outward of the trap electrode 7, respectively. Embodiments in which a plurality of shielding electrodes 6 are provided in the same layer include an embodiment in which shielding electrodes are combined into a single shielding electrode 6 provided with a slit 61.

Also, it should be noted that the shielding electrode 6 and the trap electrode 7 may be provided on a side of the non-display area 60 on which the driving circuit 38 is provided. Along with or in place of the scanning lines 11 in the non-display area 60, the shielding electrode 6 and the trap electrode 7 may be provided above the image signal lines 21 in the non-display area 60.

Furthermore, the alignment film 39 may be provided in the non-display area 60 and also extend to the vicinity of the sealing member 95. In this case, the shielding electrode 6 may be provided above the alignment film 39. Furthermore, in this case, the shielding electrode 6 may be provided just above or just below the alignment film 39. Thereby, it is possible to effectively restrict in the display area 50, collection of ions generated from the alignment film 39 located in the non-display area 60.

<Second Embodiment>

Figure 9:
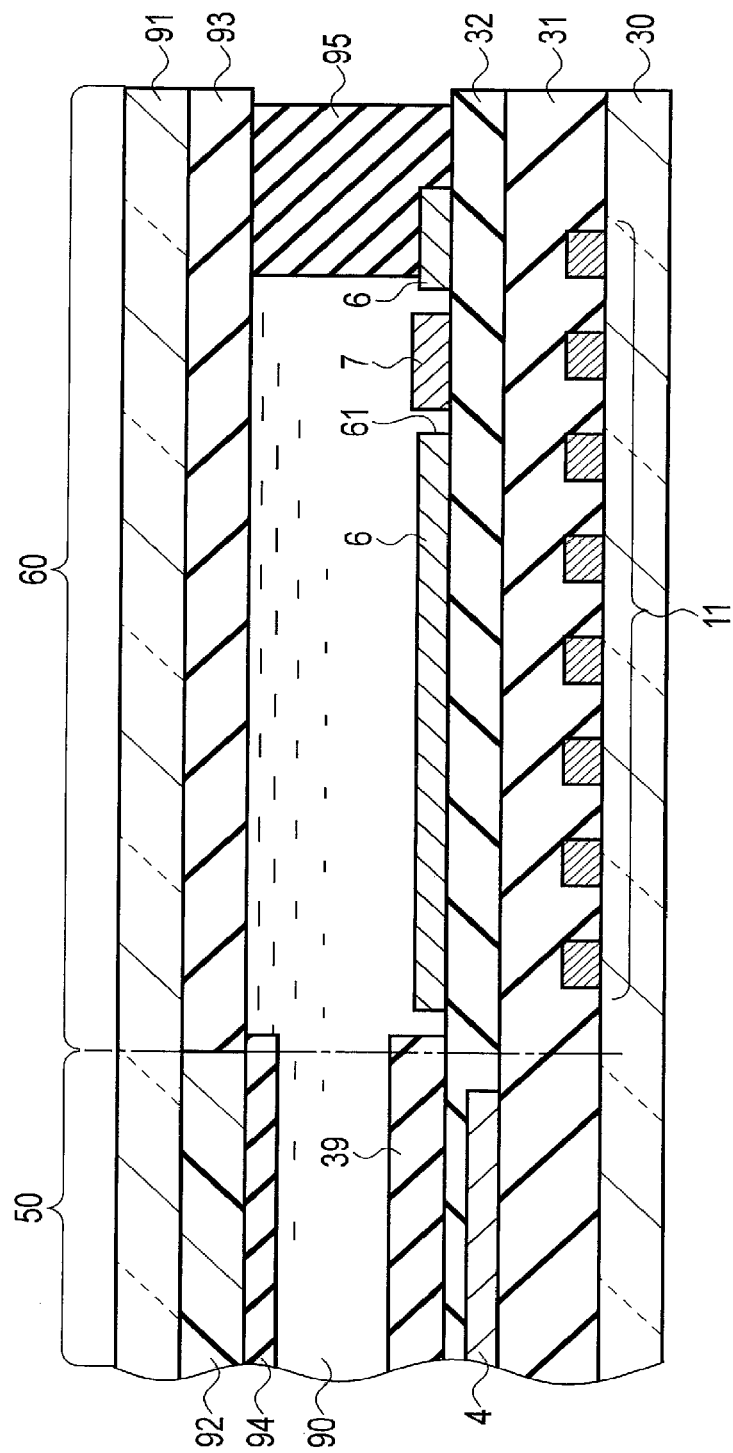
FIG. 9 is a cross-sectional view of a liquid crystal display device according to a second embodiment.

FIG. 9 is a cross-sectional view of a liquid crystal display device 100 according to the second embodiment.

With respect to each of the embodiments described herein, explanations of structural features which are the same as those in a previous one of the embodiments will be omitted.

A shielding electrode 6 is the same as the shielding element 6 in the first embodiment. A trap electrode 7 is provided on an insulating layer 32. That is, the shielding electrode 6 and the trap electrode 7 are provided in the same layer. Also, the trap electrode 7 is provided in a slit 61 formed in the shielding electrode 6.

In the second embodiment, the trap electrode 7 is provided in the same layer as the alignment film 39. Thereby, the trap electrode 7 can effectively collect ions generated from an alignment film 39.

Also, the trap electrode 7 is provided on an insulating layer 32. That is, the trap electrode 7 is provided close to a liquid crystal 90. Thereby, the trap electrode 7 can effectively collect ions generated from the liquid crystal 90.

Furthermore, the shielding electrode 6 and the trap electrode 7 are provided in the same layer. Thus, in the case of manufacturing the liquid crystal display device 100, the shielding electrode 6 and the trap electrode 7 can be formed in simple steps.

It should be noted that the alignment film 39 may be provided in a non-display area 60 and also extend to the vicinity of a sealing member 95. In this case, the trap electrode 7 may be provided above the alignment film 39. Also, in this case, the trap electrode 7 may be provided just above or just below the alignment film 39.

<Third Embodiment>

Figure 10:
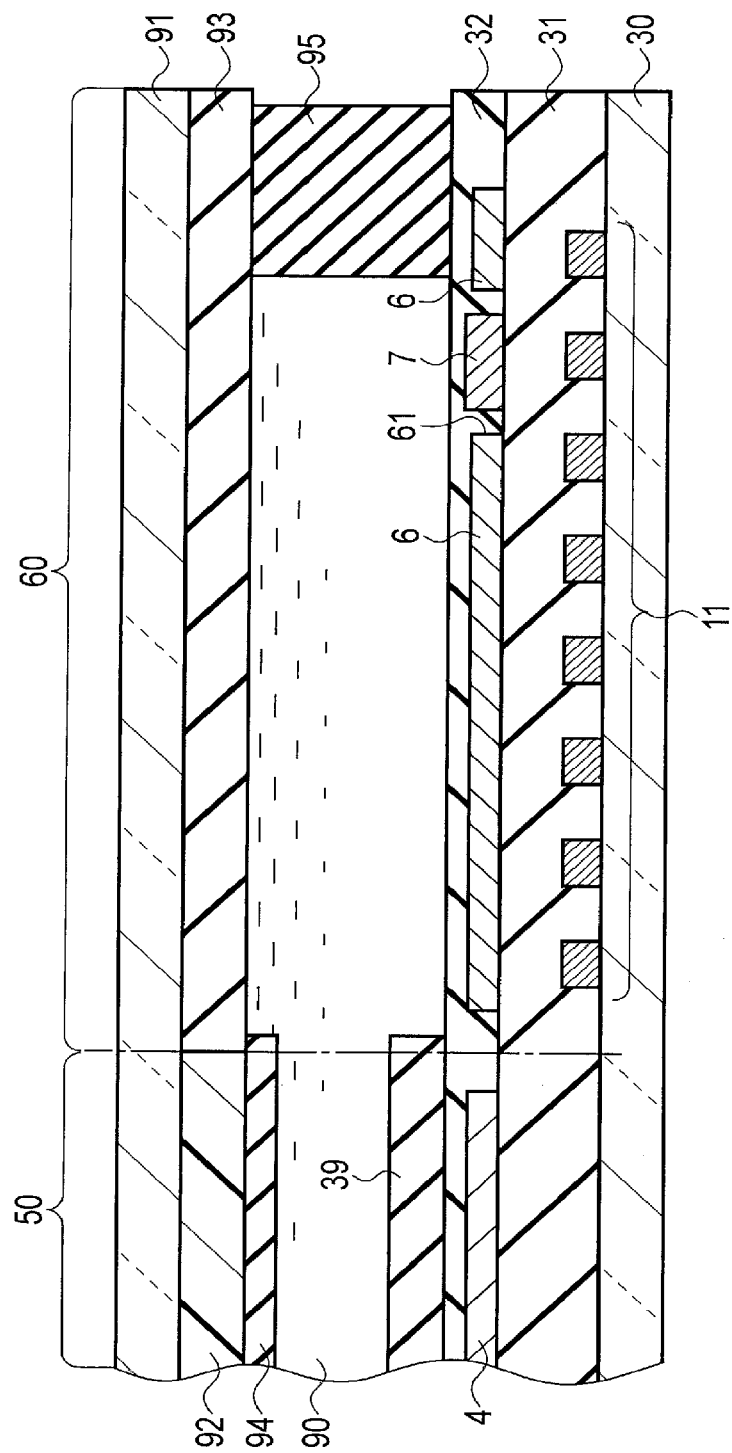
FIG. 10 is a cross-sectional view of a liquid crystal display device according to a third embodiment.

FIG. 10 is a cross-sectional view of a liquid crystal display device 100 according to the third embodiment. In this embodiment, two shielding electrodes 6 are provided as an inner shielding electrode 6 close to a display area 50 and an outer shielding electrode 6 far from the display area 50, respectively. A shielding electrode 6 is provided on an insulating layer 31. The trap electrode 7 is also provided on the insulating layer 31. The trap electrode 7 is located between the inner shielding electrode 6 and outer shielding electrode 6.

In the third embodiment, the shielding electrodes 6 are provided in the same layer as the common electrode 4. Thereby, it is possible to form in a simple step a structure for electrically connecting the shielding electrodes 6 and the common electrode 4 to each other.

In such a manner, in the third embodiment, the shielding electrode 6 and the trap electrode 7 are provided on the insulating layer 31. That is, the shielding electrode 6 and the trap electrode 7 are located close to the scanning lines 11. Therefore, the shielding electrode 6 and the trap electrode 7 can effectively block and collect ions close to the scanning lines 11.

<Fourth Embodiment>

Figure 11:
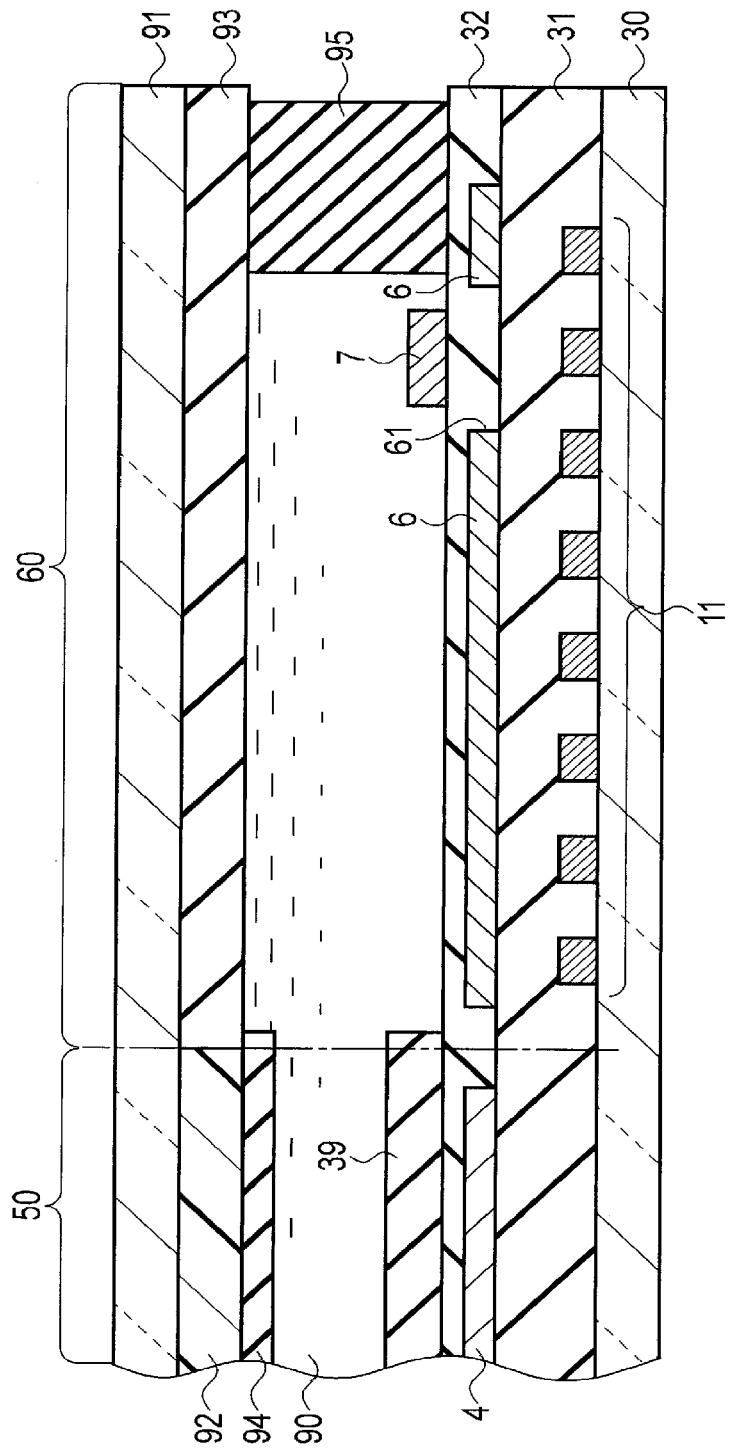
FIG. 11 is a cross-sectional view of a liquid crystal display device according to a fourth embodiment.

FIG. 11 is a cross-sectional view of a liquid crystal display device 100 according to the fourth embodiment. In this embodiment, a shielding electrode 6 is provided on an insulating layer 31. A trap electrode 7 is provided on an insulating layer 32 located above the shielding electrode 6. Also, as seen in plan view, the trap electrode 7 is located in a slit 61 in the shielding electrode 6.

In such a manner, in the fourth embodiment, the trap electrode 7 is provided on the insulating layer 32 located above the shielding electrode 6. Thus, the trap electrode 7 can collect ions on its side-surface side, in addition to ions on its upper-surface side.

<Fifth Embodiment>

Figure 12:
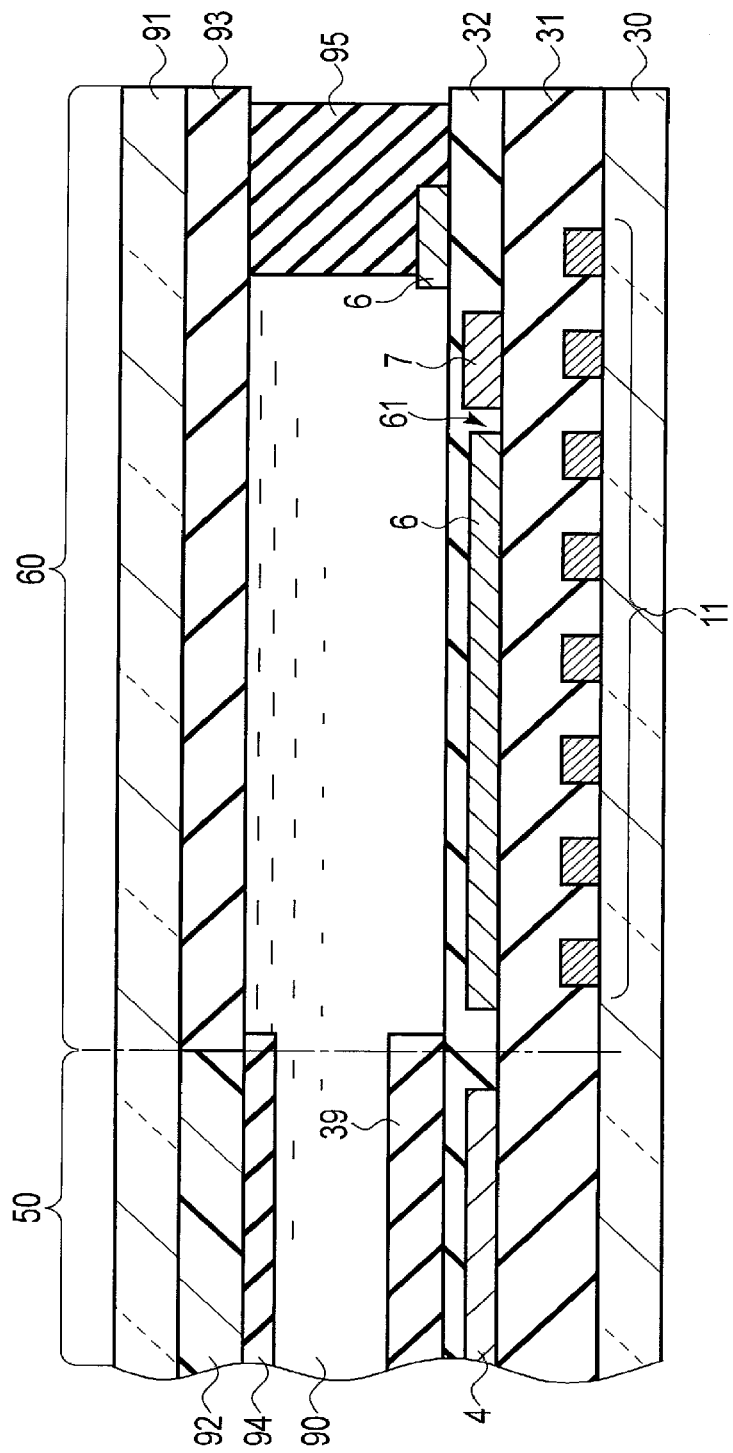
FIG. 12 is a cross-sectional view of a liquid crystal display device according to a fifth embodiment.

FIG. 12 is a cross-sectional view of a liquid crystal display device 100 according to the fifth embodiment. In this embodiment, two shielding electrodes 6 are provided as an inner shielding electrode 6 close to a display area 50 and an outer shielding electrode 6 far from the display area 50, respectively.

The inner shielding electrode 6 is provided on an insulating layer 31. The outer shielding electrode 6 is provided on an insulating layer 32. The inner shielding electrode 6 is wider than the outer shielding electrode 6. A trap electrode 7 is also provided on the insulating layer 31, and as seen in plan view, it is located between the inner shielding electrode 6 and the outer shielding electrode 6.

In the fifth embodiment, since the inner shielding electrode 6 is provided in the same layer as a common electrode 4, a structure for electrically connecting the inner shielding electrode 6 and the common electrode 4 to each other can be formed in a simple step. On the other hand, since the outer shielding electrode 6 is provided on the insulating layer 32, it can effectively prevent ions from the outside of the sealing member 95 or the display device 100 from entering the display device 100.

<Sixth Embodiment>

Figure 13:
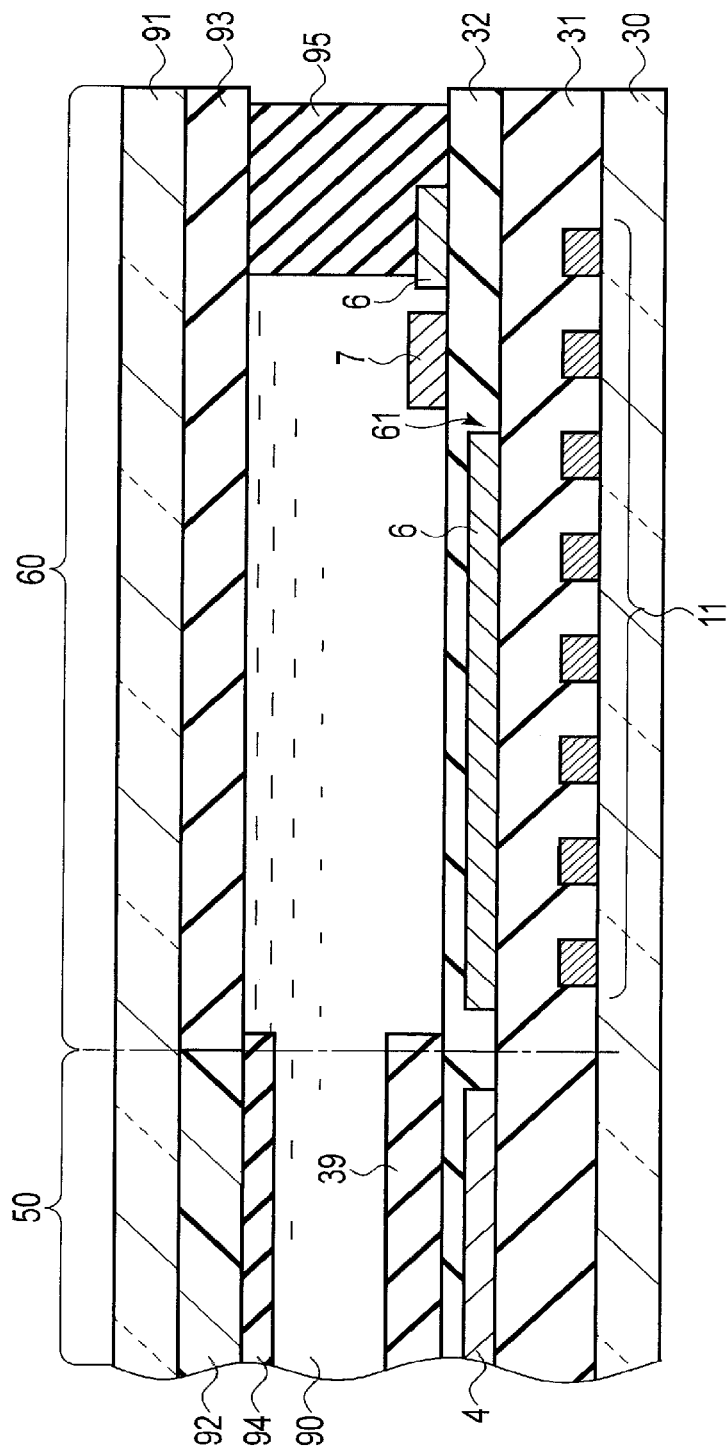
FIG. 13 is a cross-sectional view of a liquid crystal display device according to a sixth embodiment.

FIG. 13 is a cross-sectional view of a liquid crystal display device 100 according to the sixth embodiment. In this embodiment, two shielding electrodes 6 are provided in the same way as in the fifth embodiment; however, unlike the fifth embodiment, a trap electrode 7 is provided on an insulating layer 32.

<Seventh Embodiment>

Figure 14:
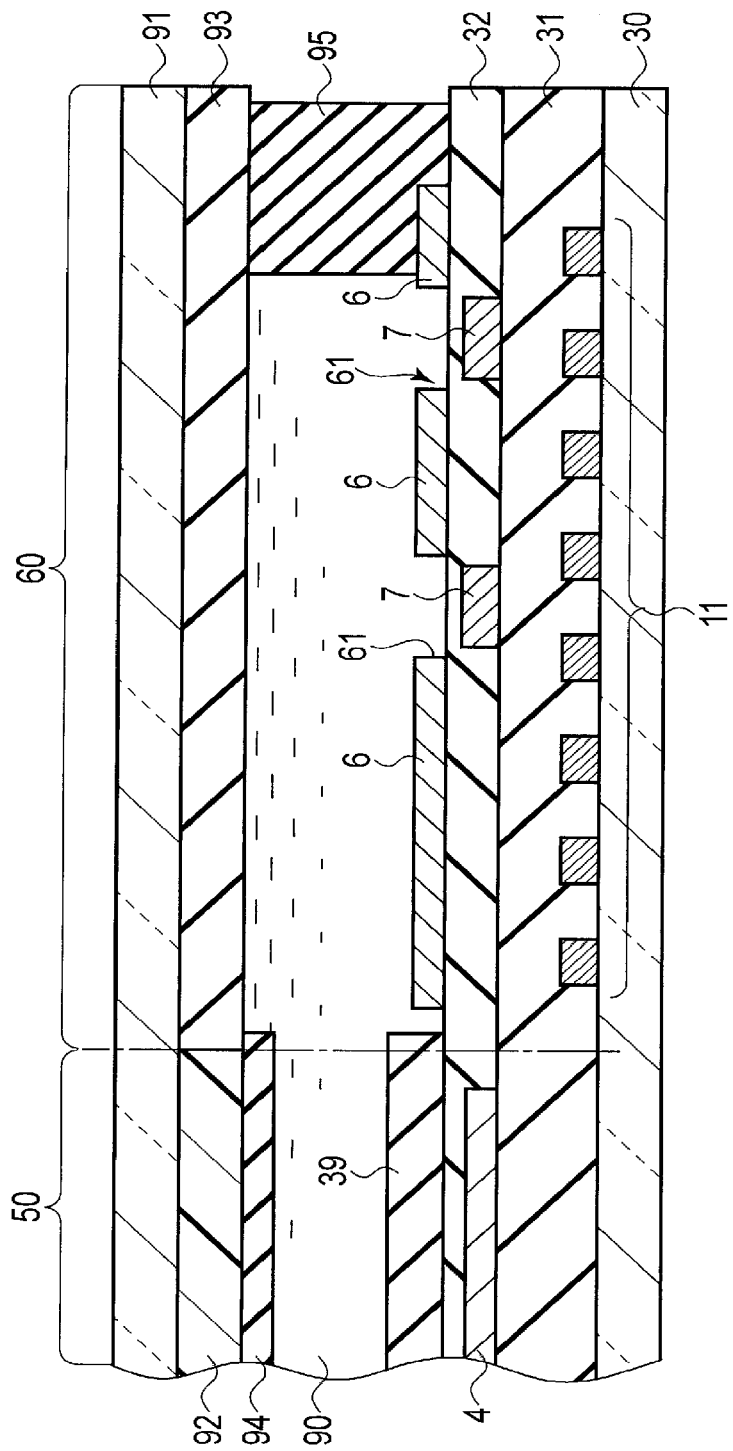
FIG. 14 is a cross-sectional view of a liquid crystal display device according to a seventh embodiment.

FIG. 14 is a cross-sectional view of a liquid crystal display device 100 according to the seventh embodiment. In this embodiment, three shielding electrodes 6 are provided as an inner shielding electrode 6, an intermediate shielding electrode 6 and an outer shielding electrode 6 in the non-display area 60, the inner shielding electrode 6 being located close to a display area 50, the outer shielding electrode 6 being located far from the display area 50. The three shielding electrodes 6 are U-shaped along three sides of the non-display area 60. Of the widths of those shielding electrodes 6, the width of the inner shielding electrode 6 is the greatest, that of the intermediate shielding electrode 6 is intermediate, and that of the outer shielding electrode 6 is the smallest. The three shielding electrodes 6 are provided on an insulating layer 32.

Two trap electrodes 7 are provided. As seen in plan view, the two trap electrodes 7 are U-shaped along three sides of the non-display area 60. The two trap electrodes 7 are provided on an insulating layer 31.

As seen in plan view, the two trap electrodes 7 are located between the inner shielding electrode 6 and the intermediate shielding electrode 6 and between the intermediate shielding electrode 6 and the outer shielding electrode 6. It should be noted that the two trap electrodes 7 may be connected and provided as a single trap electrode 7.

<Eighth Embodiment>

Figure 15:
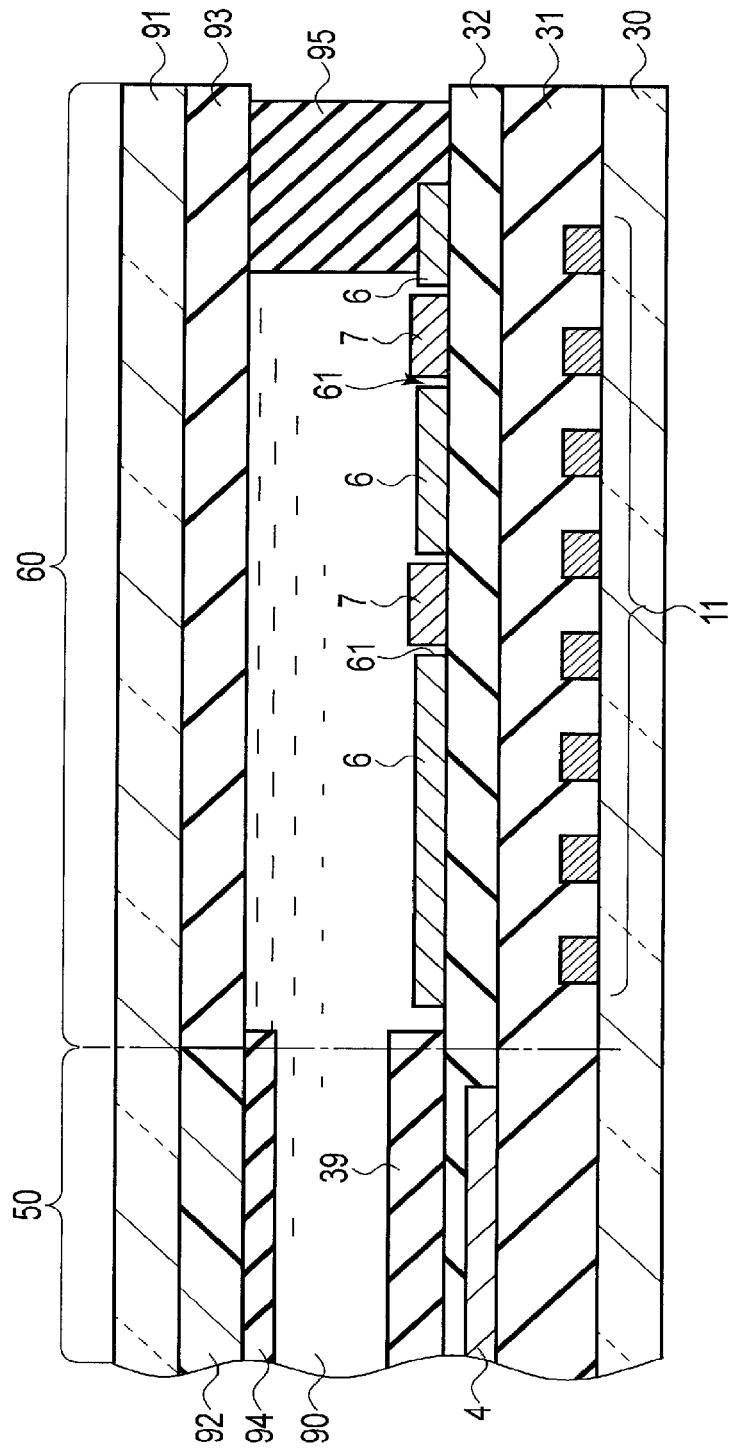
FIG. 15 is a cross-sectional view of a liquid crystal display device according to an eighth embodiment.

FIG. 15 is a cross-sectional view of a liquid crystal display device 100 according to the eighth embodiment. In this embodiment, three shielding electrodes 6 are provided in the same way as in the seventh embodiment; however, unlike the seventh embodiment, two trap electrodes 7 are provided on an insulating layer 32. That is, the three shielding electrode 6 and the two trap electrodes 7 are provided in the same layer. Furthermore, the two trap electrodes 7 are located between the inner shielding electrode 6 and the intermediate shielding electrode 6 and between the intermediate shielding electrode 6 and the outer shielding electrode 6, respectively.

<Ninth Embodiment>

Figure 16:
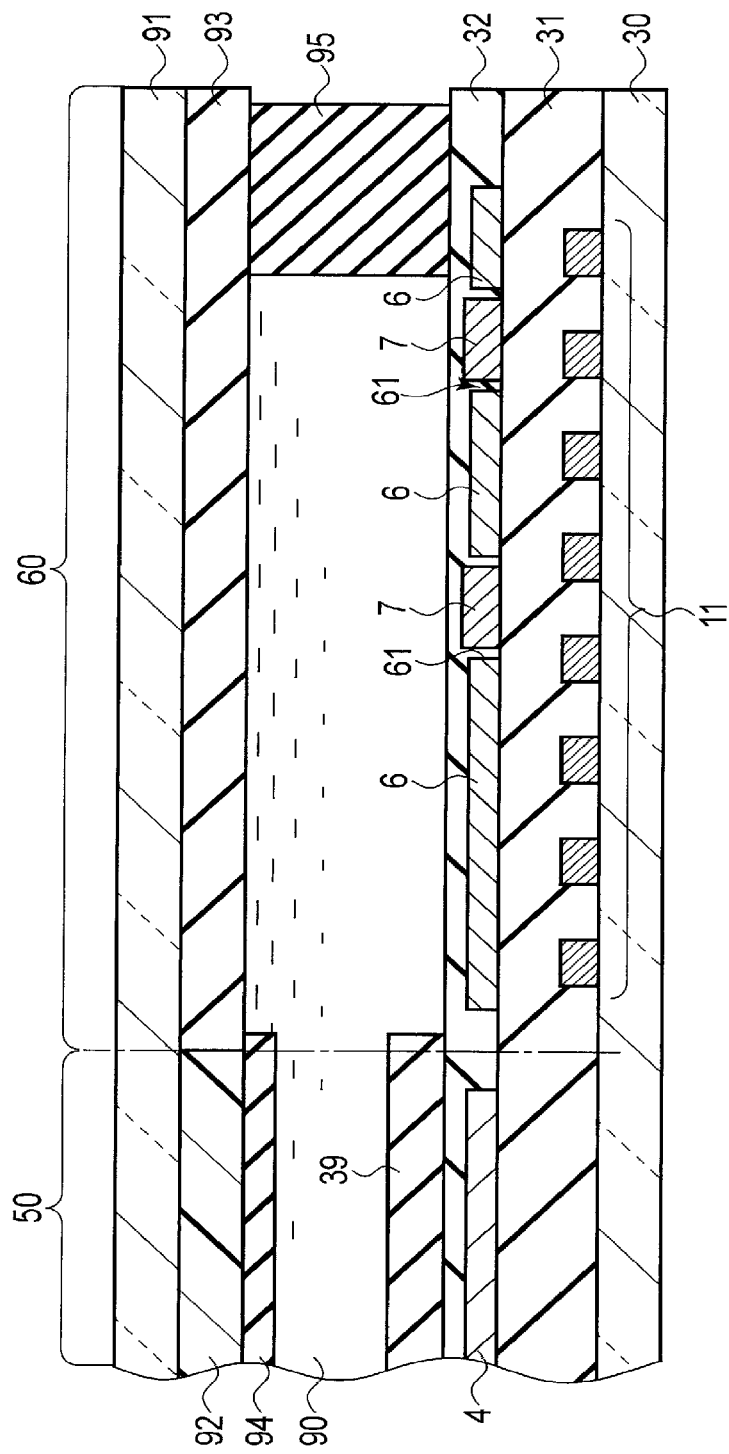
FIG. 16 is a cross-sectional view of a liquid crystal display device according to a ninth embodiment.

FIG. 16 is a cross-sectional view of a liquid crystal display device 100 according to the ninth embodiment. In this embodiment, three shielding electrodes 6 are provided as an inner shielding electrode 6 close to a display area 50, an intermediate shielding electrode 6 and an outer shielding electrode 6 far from the display area 50, respectively.

Furthermore, two trap electrodes 7 are provided on an insulating layer 31. That is, the three shielding electrodes 6 and the two trap electrodes 7 are provided in the same layer. Furthermore, the two trap electrodes 7 are located between the inner shielding electrode 6 and the intermediate shielding electrode 6 and between the intermediate shielding electrode 6 and the outer shielding electrode 6, respectively.

<Tenth Embodiment>

Figure 17:
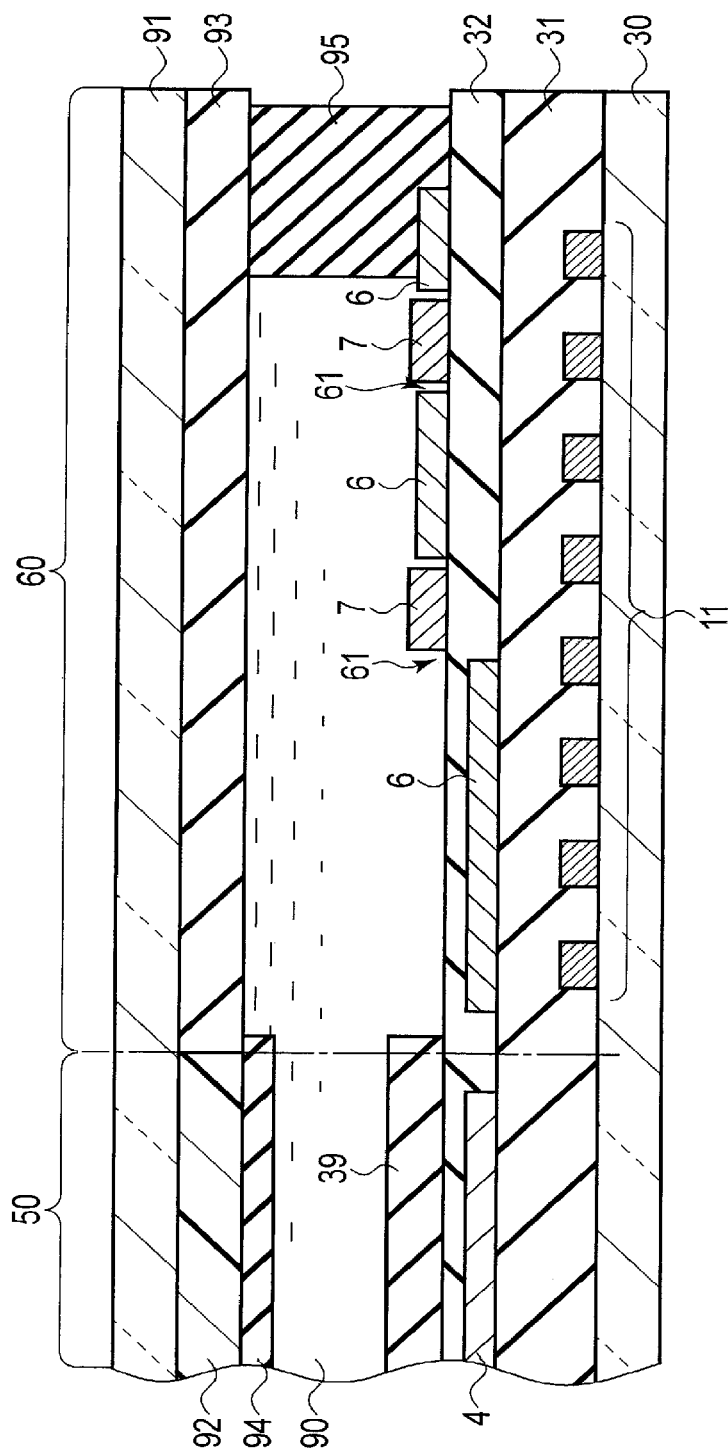
FIG. 17 is a cross-sectional view of a liquid crystal display device according to a tenth embodiment.

FIG. 17 is a cross-sectional view of a liquid crystal display device 100 according to the tenth embodiment. In this embodiment, three shielding electrodes 6 are provided as an inner shielding electrode 6 close to a display area 50, an intermediate shielding electrode 6 and an outer shielding electrode 6 far from the display area 50. The inner shielding electrode 6 is provided on an insulating layer 31. The intermediate shielding electrode 6 and the outer shielding electrode 6 are provided on an insulating layer 32.

Furthermore, the two trap electrodes 7 are provided on an insulating layer 32. One of the trap electrodes 7 is located inward of the intermediate shielding electrode 6. The other trap electrode 7 is located between the intermediate shielding electrode 6 and the outer shielding electrode 6.

<Eleventh Embodiment>

Figure 18:
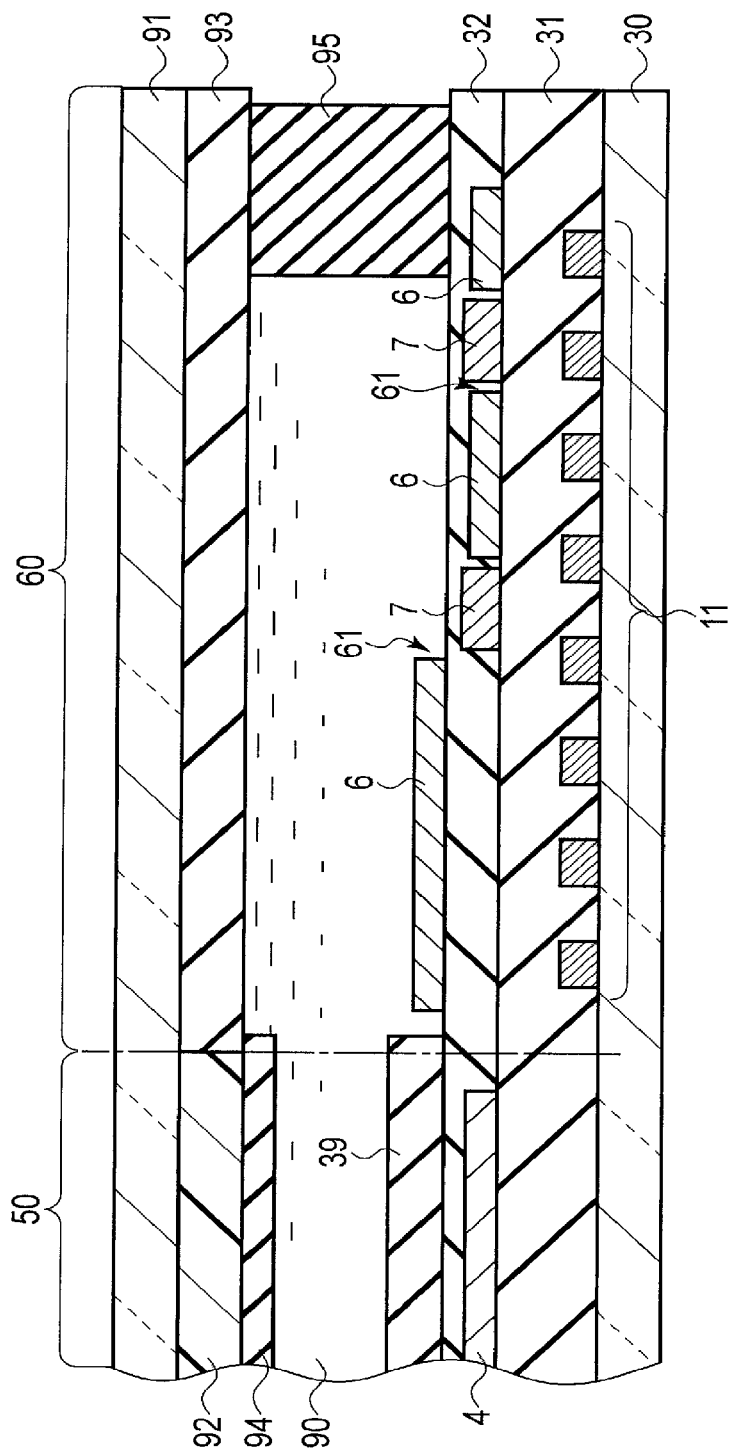
FIG. 18 is a cross-sectional view of a liquid crystal display device according to an eleventh embodiment.

FIG. 18 is a cross-sectional view of a liquid crystal display device 100 according to the eleventh embodiment. In this embodiment, three shielding electrodes 6 are provided as an inner shielding electrode 6 close to a display area 50, an intermediate shielding electrode 6 and an outer shielding electrode 6 far from the display area 50, respectively. The inner shielding electrode 6 is provided on an insulating layer 32. The intermediate shielding electrode 6 and the outer shielding electrode 6 are located on an insulating layer 31.

Furthermore, two trap electrodes 7 are provided on the insulating layer 32. One of the trap electrodes 7 is located inward of the intermediate shielding electrode 6. The other trap electrode 7 is located between the intermediate shielding electrode 6 and the outer shielding electrode 6.

<Twelfth Embodiment>

Figure 19:
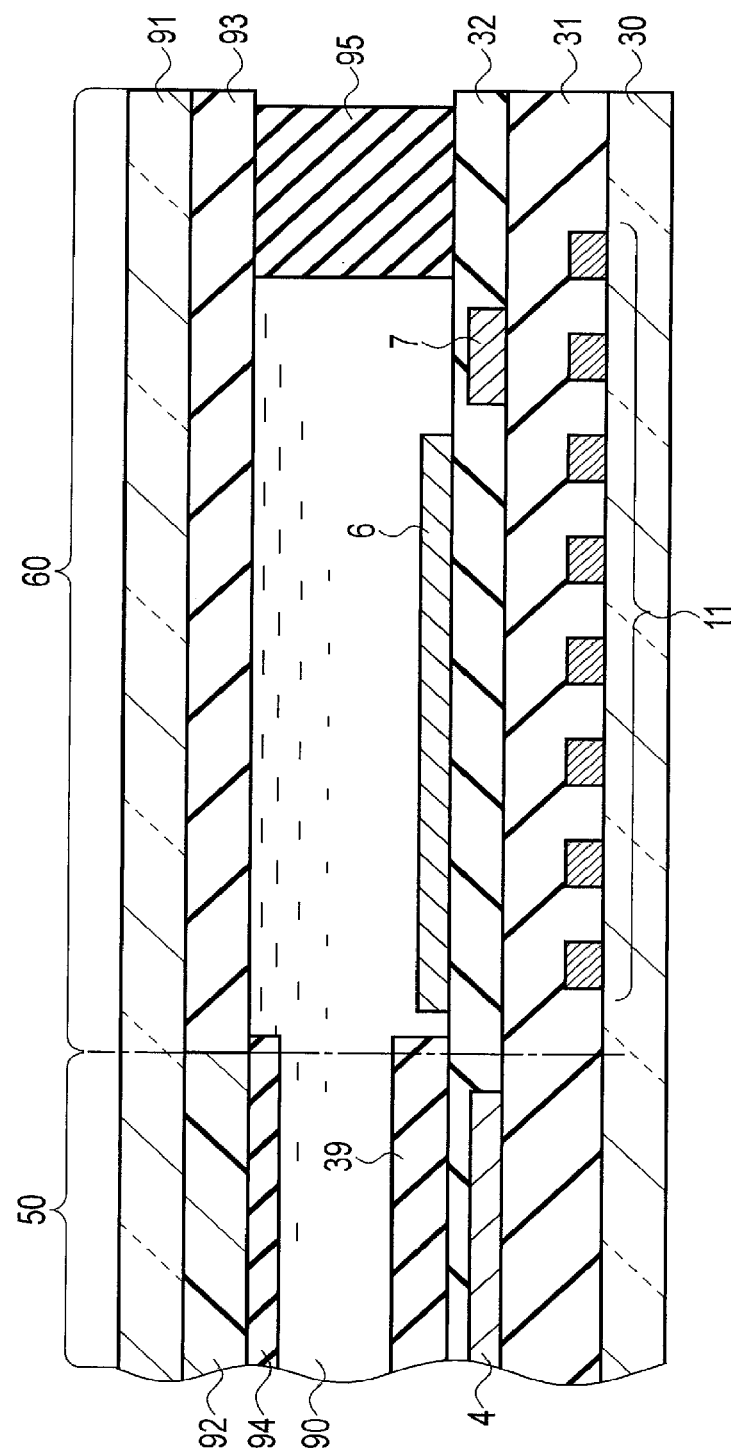
FIG. 19 is a cross-sectional view of a liquid crystal display device according to a twelfth embodiment.

FIG. 19 is a cross-sectional view of a liquid crystal display device 100 according to a twelfth embodiment. In this embodiment, a shielding electrode 6 is provided to extend from a location close to a display area 50 to a location outward of the center of the display area 50. The shielding electrode 6 is provided on an insulating layer 32. The shielding electrode 6 is located above the majority of scanning lines 11 located at one side portion of a non-display area 60.

As seen in plan view, a trap electrode 7 is provided outward of the shielding electrode 6. The trap electrode 7 is also provided on the insulating layer 31.

In such a manner, in the twelfth embodiment, the shielding electrode 6 is located inward of the trap electrode 7; that is, the trap electrode 7 is located outward of the shielding electrode 6. It is therefore possible to collect ions on a side far from the display area 50.

<Thirteenth Embodiment>

Figure 20:
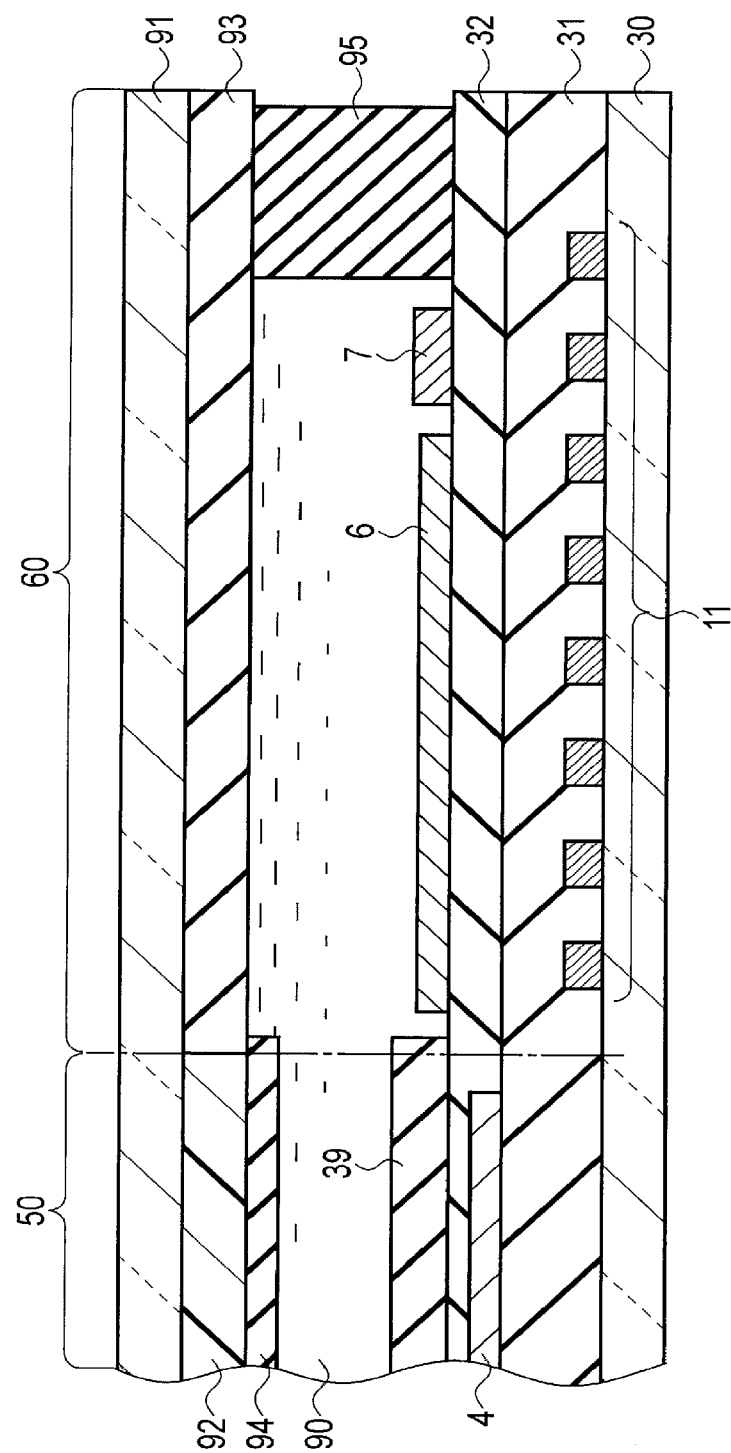
FIG. 20 is a cross-sectional view of a liquid crystal display device according to a thirteenth embodiment.

FIG. 20 is a cross-sectional view of a liquid crystal display device 100 according to the thirteenth embodiment. In this embodiment, a shielding electrode 6 is provided in the same way as in the twelfth embodiment. As seen in plan view, a trap electrode 7 is provided outward of the shielding electrode 6. The trap electrode 7 is provided on an insulating layer 32.

<Fourteenth Embodiment>

Figure 21:
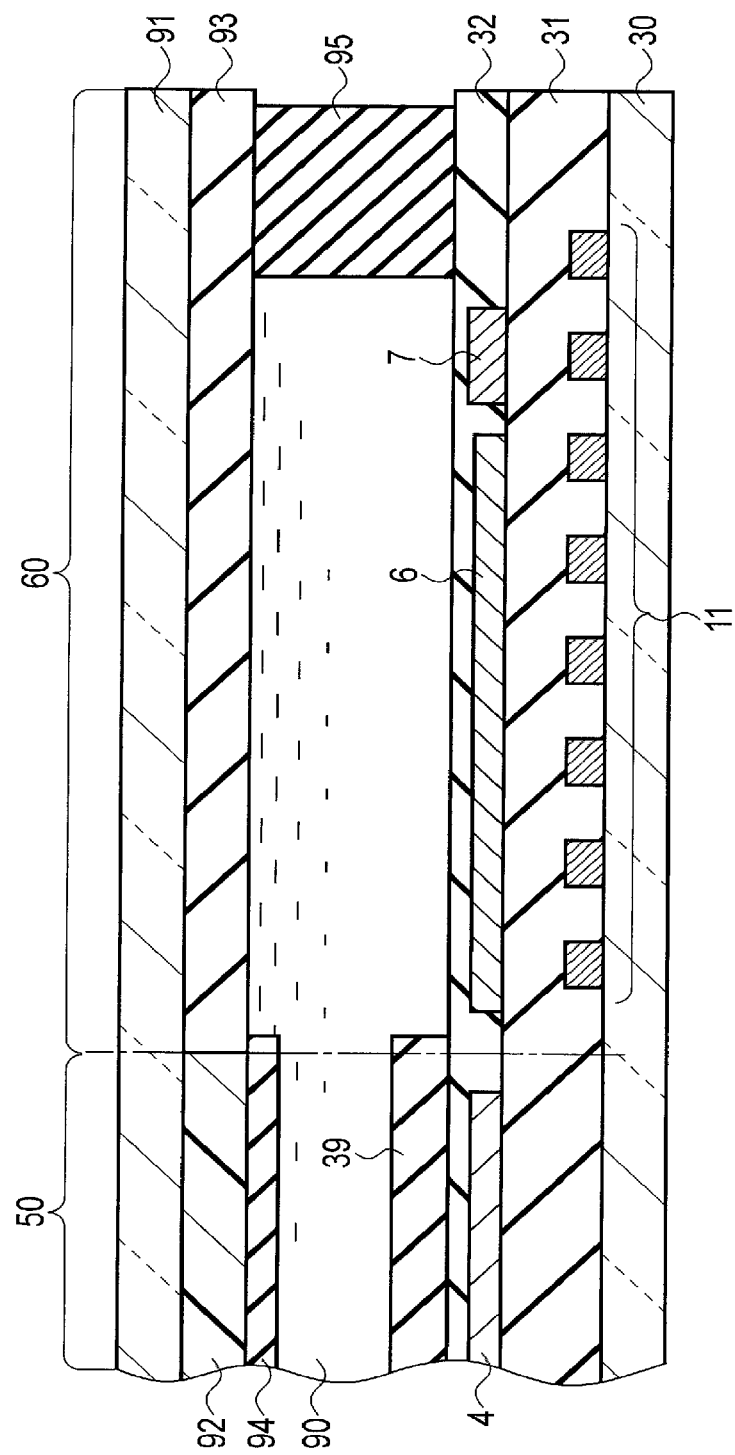
FIG. 21 is a cross-sectional view of a liquid crystal display device according to a fourteenth embodiment.

FIG. 21 is a cross-sectional view of a liquid crystal display device 100 according to the fourteenth embodiment. In this embodiment, a shielding electrode 6 is provided to extend from a location close to a display area 50 to a location outward of the center of a non-display area 60 in the width direction thereof. The shielding electrode 6 is provided on an insulating layer 31.

As seen in plan view, a trap electrode 7 is provided outward of the shielding electrode 6. The trap electrode 7 is also provided on the insulating layer 31.

<Fifteenth Embodiment>

Figure 22:
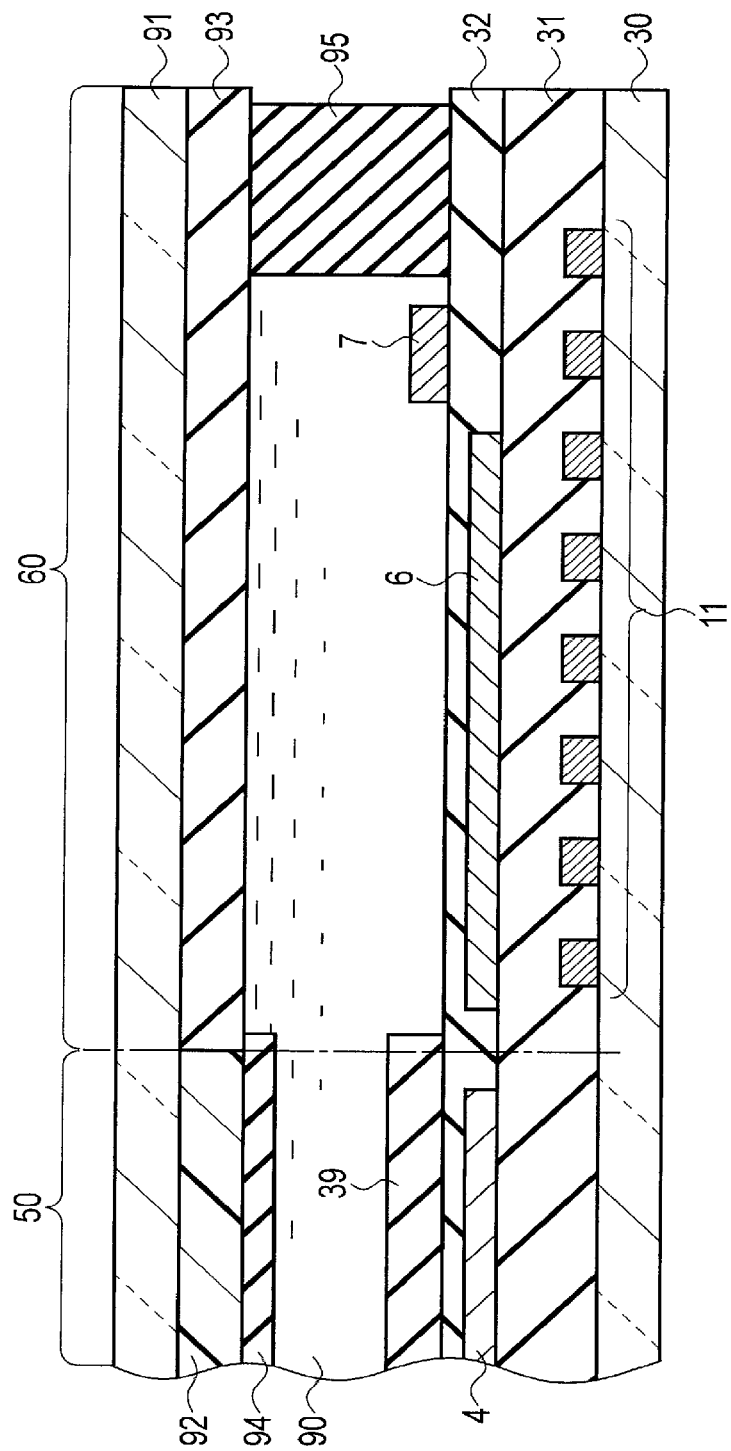
FIG. 22 is a cross-sectional view of a liquid crystal display device according to a fifteenth embodiment.

FIG. 22 is a cross-sectional view of a liquid crystal display device 100 according to the fifteenth embodiment. In this embodiment, a shielding electrode 6 is provided in the same way as in the fourteenth embodiment. As seen in plan view, a trap electrode 7 is provided outward of the shielding electrode 6. The trap electrode 7 is provided on an insulating layer 32.

<Sixteenth Embodiment>

Figure 23:
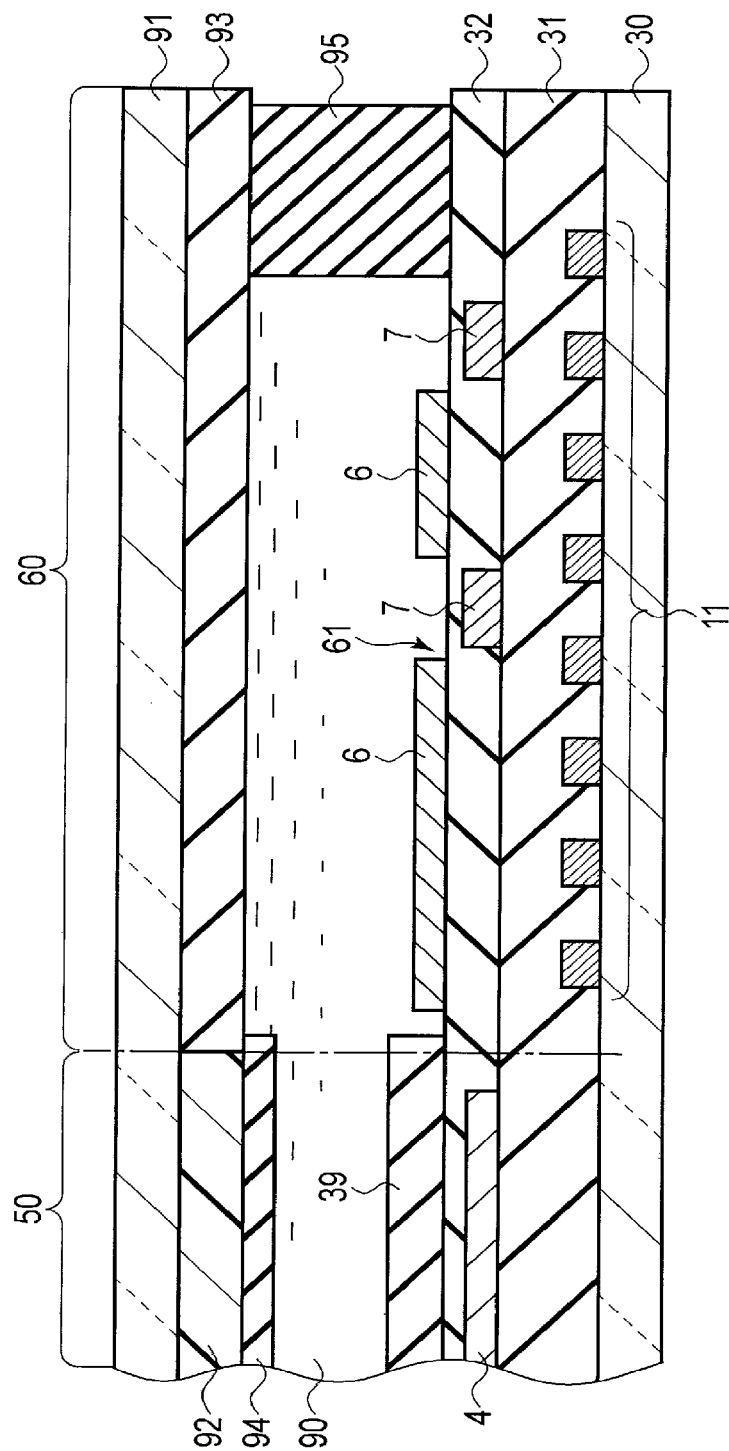
FIG. 23 is a cross-sectional view of a liquid crystal display device according to a sixteenth embodiment.

FIG. 23 is a cross-sectional view of a liquid crystal display device 100 according to the sixteenth embodiment. In this embodiment, two shielding electrodes 6 are provided as an inner shielding electrode 6 close to a display area 50 and an outer shielding electrode 6 far from the display area 50, respectively. The shielding electrodes 6 are provided on an insulating layer 32. Also, two trap electrodes 7 are provided in an inner position and an outer position, respectively. The trap electrodes 7 are provided on an insulating layer 31.

As seen in plan view, one of the trap electrodes 7 is located between the two shielding electrodes 6. Also, as seen in plan view, the other trap electrode 7 is located outward of the outer shielding portion 6. That is, in the liquid crystal display device 100 according to the sixteenth embodiment, as seen in plan view, the inner shielding electrode 6, the above one of the trap electrodes 7, the outer shielding electrode 6 and the other trap electrode 7 are arranged in this order from an inner area of the liquid crystal display device 100. It should be noted that the two shielding electrodes 6 may be combined into a single shielding electrode 6, and the two trap electrodes 7 may also be combined into a single trap electrode 7.

<Seventeenth Embodiment>

FIG. 24 is a cross-sectional view of a liquid crystal display device 100 according to the seventeenth embodiment. In this embodiment, two shielding electrodes 6 are provided in the same way as in the sixteenth embodiment. Also, two trap electrodes 7 are provided in an inner position and an outer position, respectively. The two trap electrodes 7 are located on an insulating layer 32. One of the trap electrodes 7 is located between the two shielding electrodes 6. The other trap electrode 7 is located outward of the outer shielding electrode 6.

<Eighteenth Embodiment>

Figure 25:
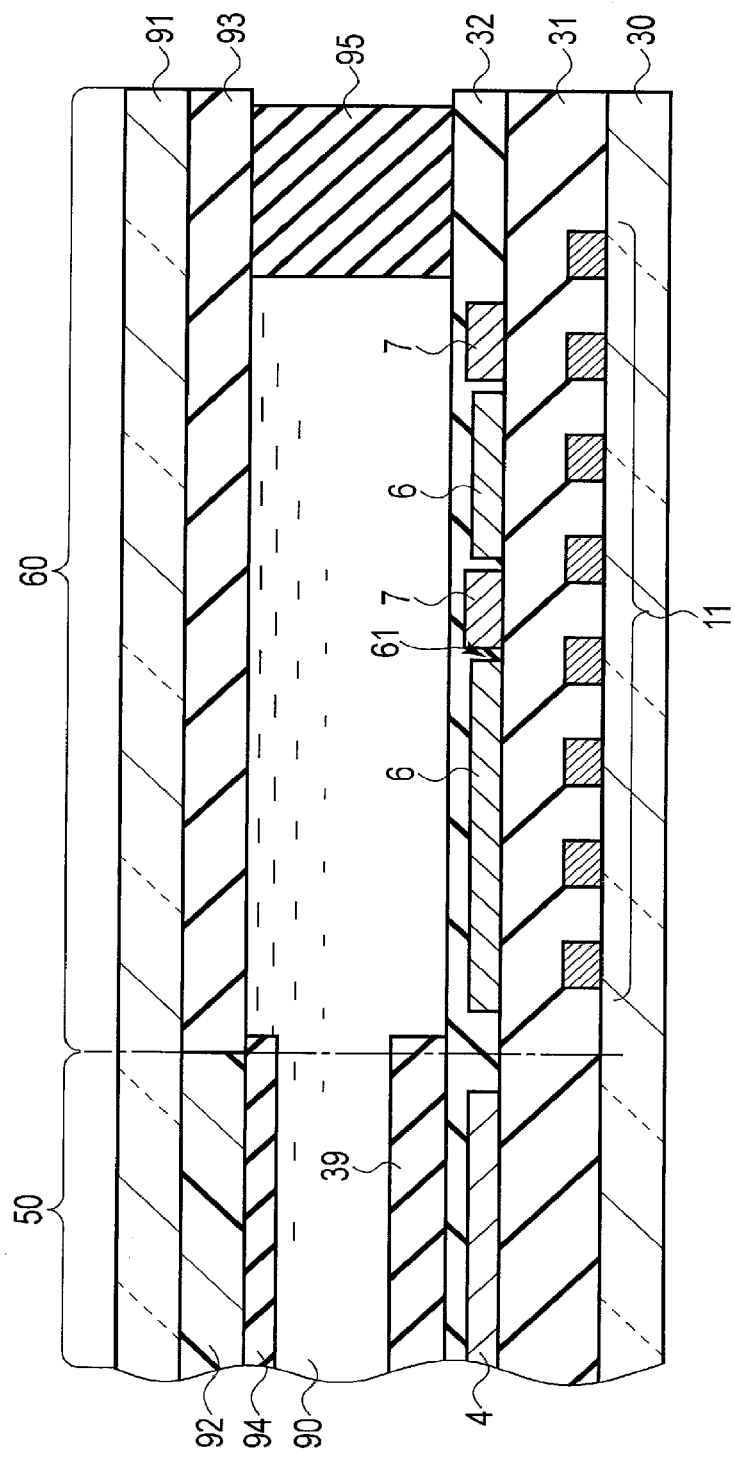
FIG. 25 is a cross-sectional view of a liquid crystal display device according to an eighteenth embodiment.

FIG. 25 is a cross-sectional view of a liquid crystal display device 100 according to the eighteenth embodiment. In this embodiment, two the shielding electrodes 6 are provided as an inner shielding electrode 6 located in an inner position and an outer shielding electrode 6 located in an outer position, respectively. The two shielding electrodes 6 are located on an insulating layer 31. Also, two trap electrodes 7 are provided in an inner position and an outer position, respectively. The two trap electrodes 7 are provided on an insulating layer 31.

<Nineteenth Embodiment>

Figure 26:
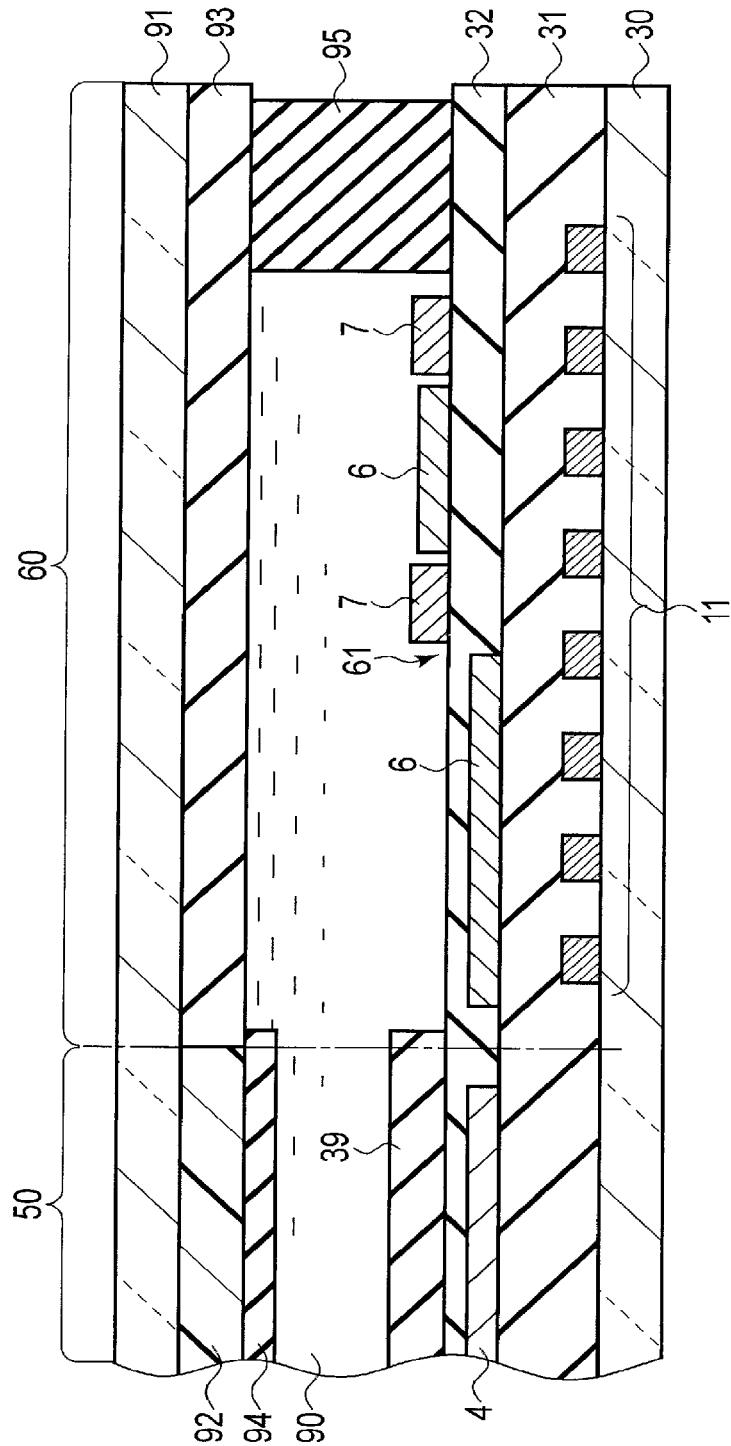
FIG. 26 is a cross-sectional view of a liquid crystal display device according to a nineteenth embodiment.

FIG. 26 is a cross-sectional view of a liquid crystal display device 100 according to the nineteenth embodiment. In this embodiment, two shielding electrodes 6 are provided as an inner shielding electrode 6 located in an inner position and an outer shielding electrode 6 located in an outer position, respectively. The inner shielding electrode 6 is provided on an insulating layer 31. The outer shielding electrode 6 is provided on an insulating layer 32.

Also, two trap electrodes 7 are provided in an inner position and an outer position, respectively. The trap electrodes 7 are provided on the insulating layer 32. One of the trap electrodes 7 is located between the two shielding electrodes 6. The other trap electrode 7 is located outward of the outer shielding electrode 6.

<Twentieth Embodiment>

Figure 27:
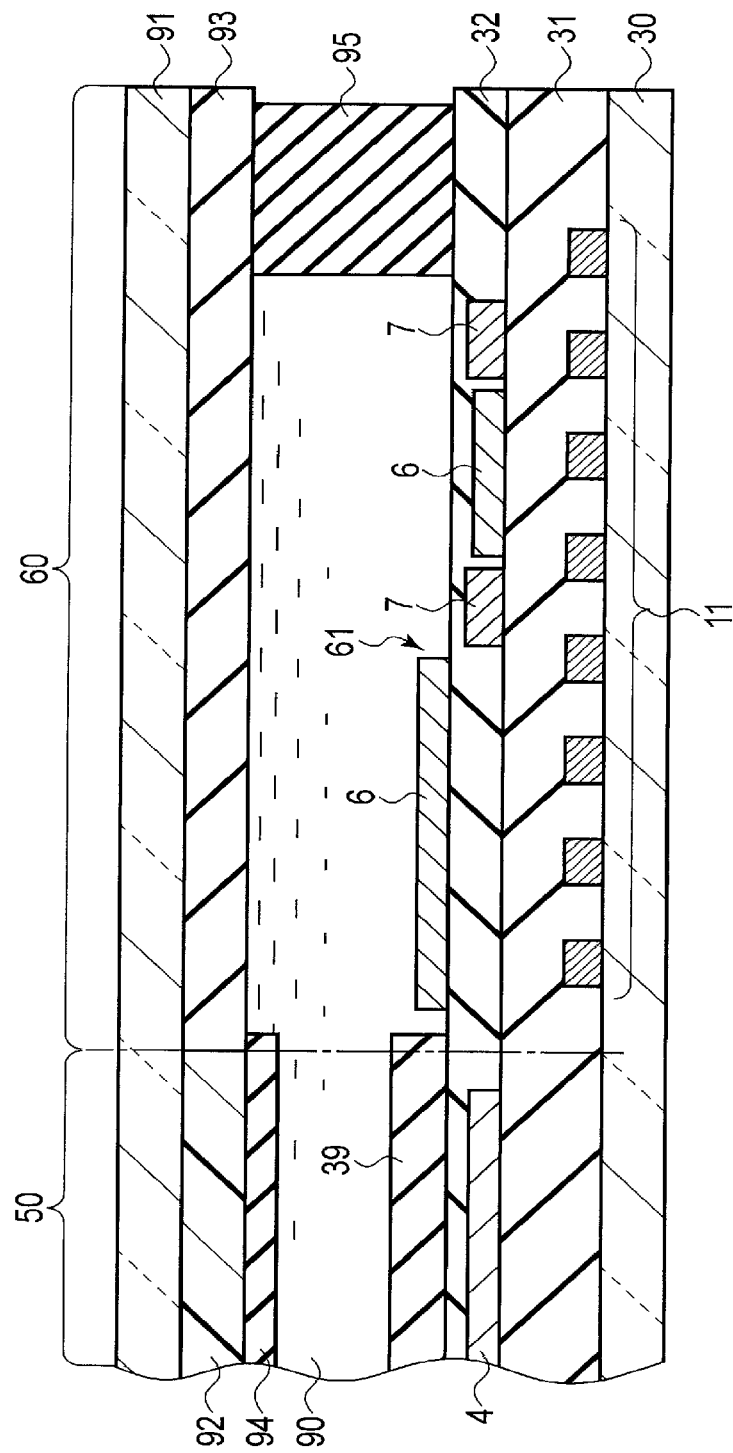
FIG. 27 is a cross-sectional view of a liquid crystal display device according to a twentieth embodiment.

FIG. 27 is a cross-sectional view of a liquid crystal display device 100 according to the twentieth embodiment. In this embodiment, two shielding electrodes 6 are provided as an inner shielding electrode 6 located in an inner position and an outer shielding electrode 6 located in an outer position, respectively. The inner shielding electrode 6 is located on an insulating layer 32. The outer shielding electrode 6 is located on an insulating layer 31.

Also, two trap electrodes 7 are provided in an inner position and an outer position, respectively. The two trap electrodes 7 are provided on an insulating layer 31. One of the trap electrodes 7 is located between the two shielding electrodes 6. The other trap electrode 7 is located outward of the outer shielding electrode 6.

<Twenty-first Embodiment>

Figure 28:
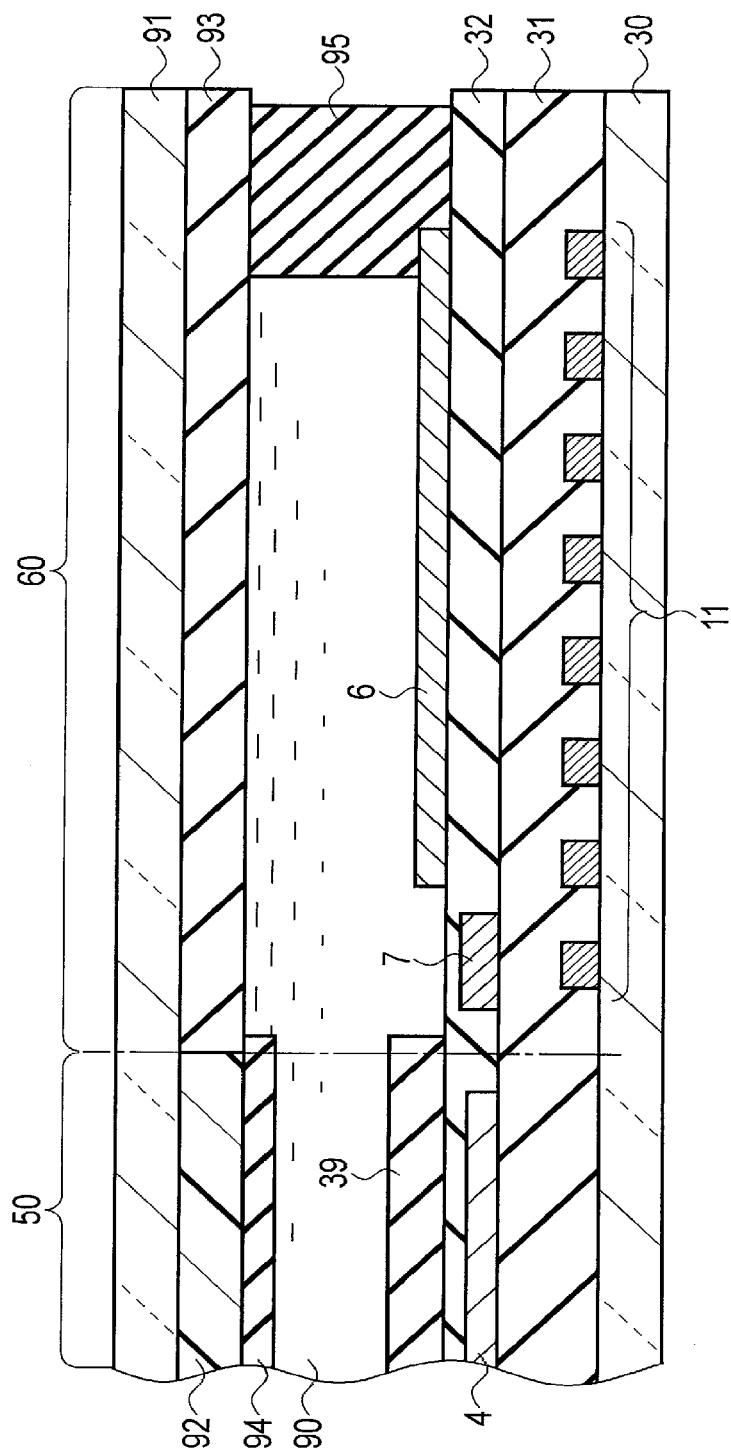
FIG. 28 is a cross-sectional view of a liquid crystal display device according to a twenty-first embodiment.

FIG. 28 is a cross-sectional view of a liquid crystal display device 100 according to the twenty-first embodiment. In this embodiment, a shielding electrode 6 is provided on an insulating layer 32. The trap electrodes 7 are provided on an insulating layer 31. As seen in plan view, the trap electrode 7 is located inward of the shielding electrode 6.

In such a manner, in the twenty-first embodiment, the trap electrode 7 is located in an inner position. Thus, the trap electrode 7 collects in a non-display area 60, ions existing close to the boundary between a display area 50 and a non-display area 60.

<Twenty-second Embodiment>

Figure 29:
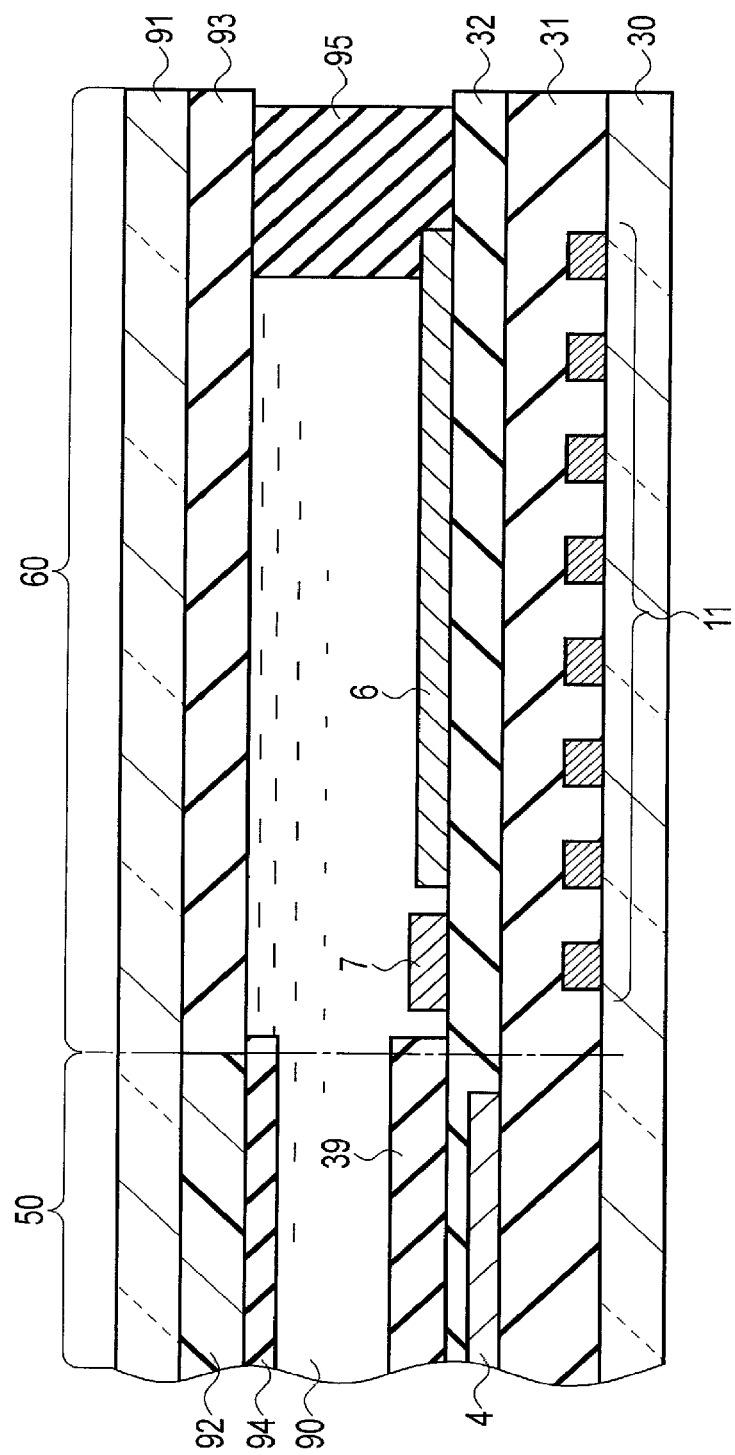
FIG. 29 is a cross-sectional view of a liquid crystal display device according to a twenty-second embodiment.

FIG. 29 is a cross-sectional view of a liquid crystal display device 100 according to the twenty-second embodiment. In this embodiment, a shielding electrode 6 is provided in the same way as in the twenty-first embodiment. The trap electrodes 7 are provided on an insulating layer 32. The trap electrode 7 is located inward of the shielding electrode 6.

<Twenty-third Embodiment>

Figure 30:
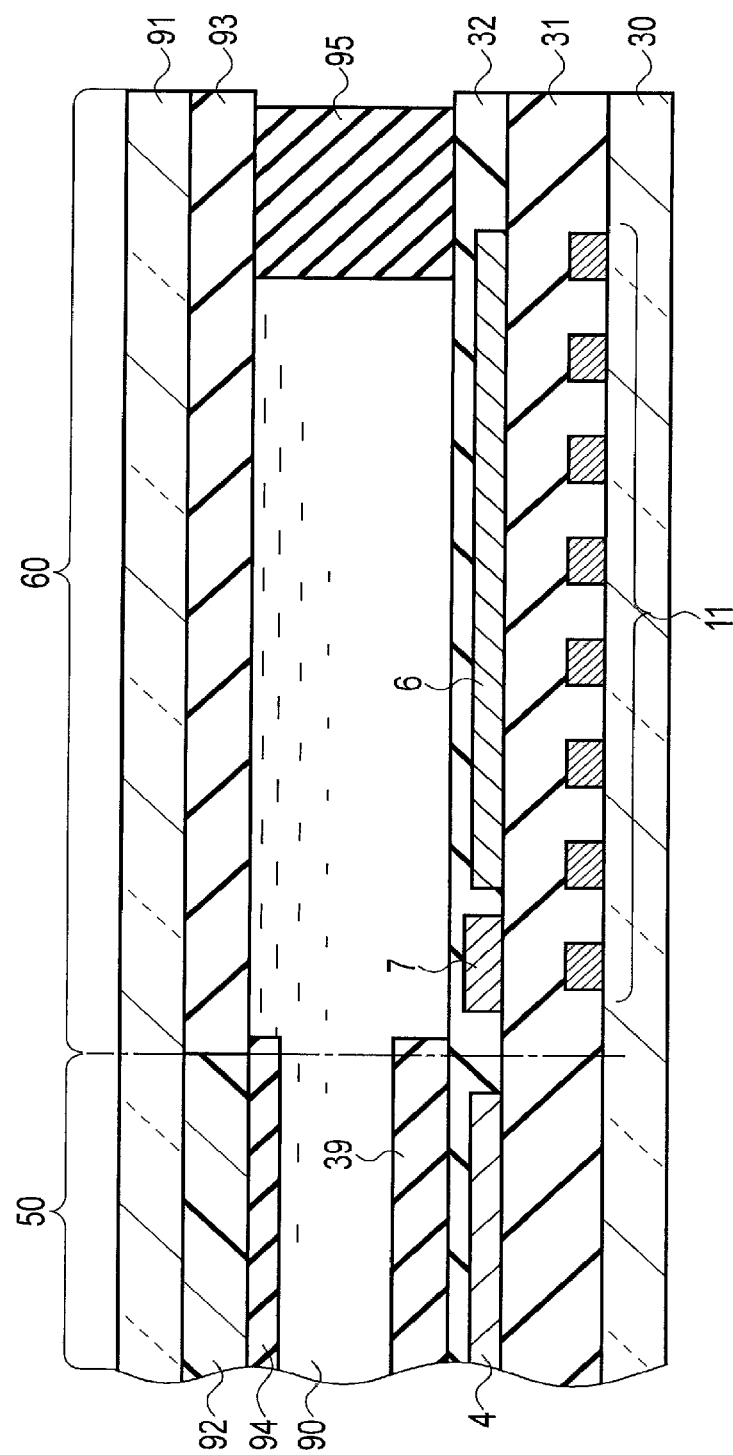
FIG. 30 is a cross-sectional view of a liquid crystal display device according to a twenty-third embodiment.

FIG. 30 is a cross-sectional view of a liquid crystal display device 100 according to the twenty-third embodiment. In this embodiment, a shielding electrode 6 is provided on an insulating layer 31. The trap electrodes 7 are provided on an insulating layer 31. The trap electrode 7 is located inward of the shielding electrode 6.

<Twenty-fourth Embodiment>

Figure 31:
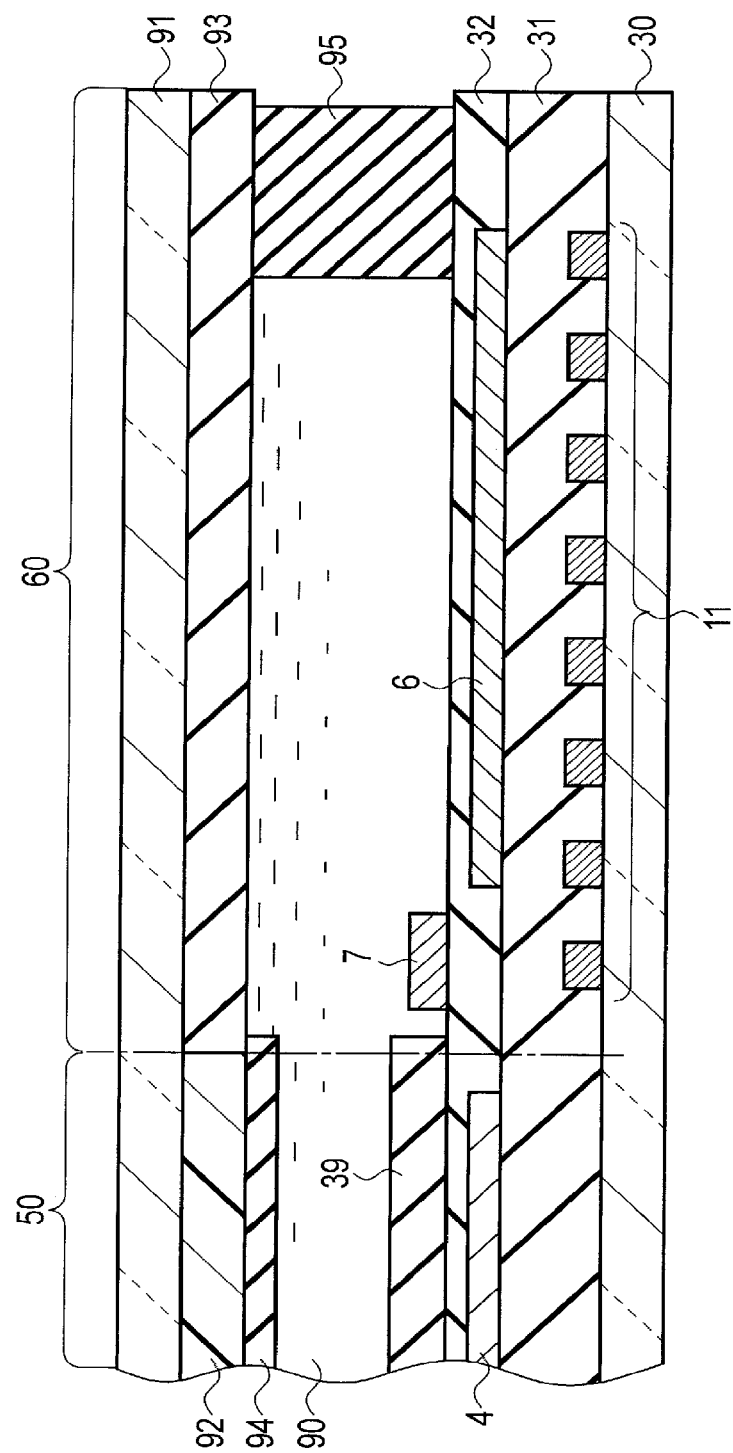
FIG. 31 is a cross-sectional view of a liquid crystal display device according to a twenty-fourth embodiment.

FIG. 31 is a cross-sectional view of a liquid crystal display device 100 according to the twenty-fourth embodiment. In this embodiment, a shielding electrode 6 is provided on an insulating layer 31. A trap electrode 7 is provided on an insulating layer 32. As seen in plan view, the trap electrode 7 is located inward of the shielding electrode 6.

<Twenty-fifth Embodiment>

Figure 32:
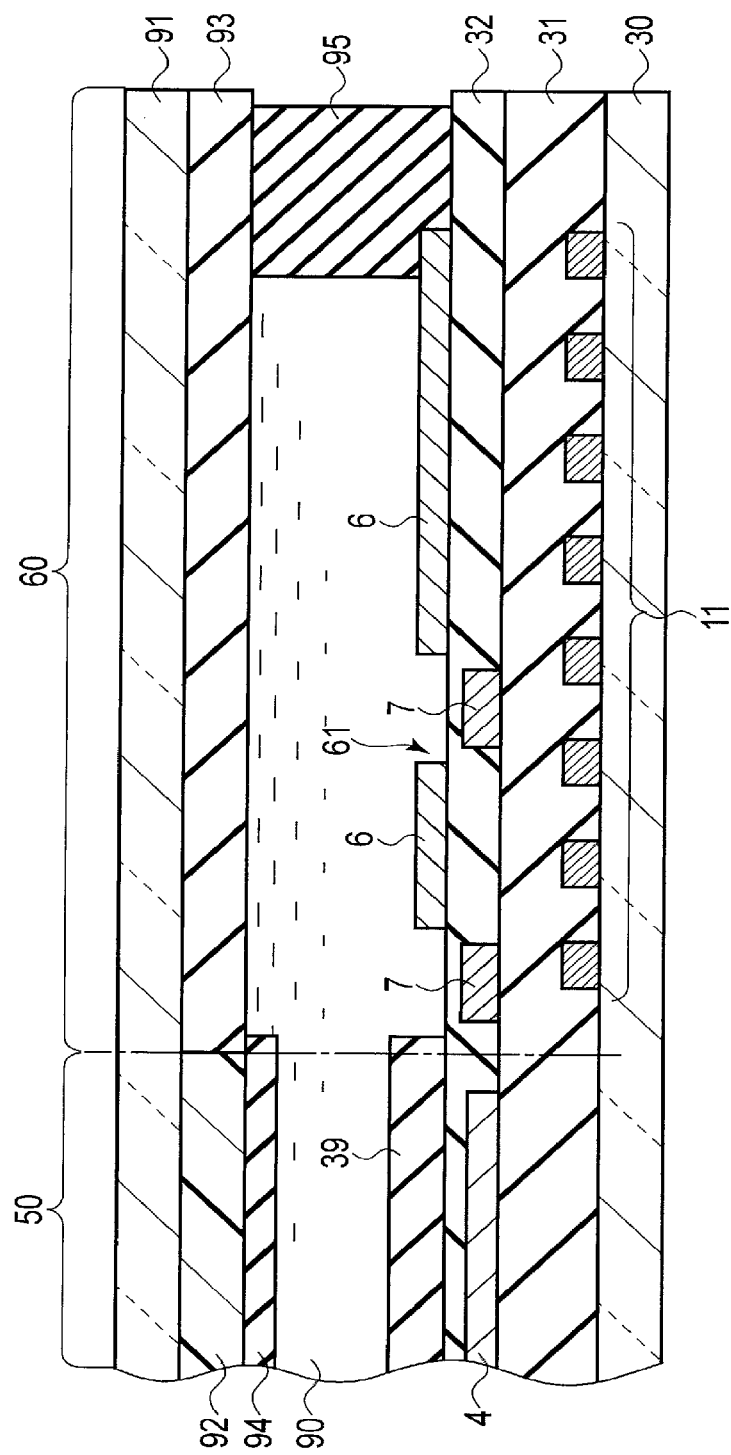
FIG. 32 is a cross-sectional view of a liquid crystal display device according to a twenty-fifth embodiment.

FIG. 32 is a cross-sectional view of a liquid crystal display device 100 according to the twenty-fifth embodiment. In this embodiment, two shielding electrodes 6 are provided as an inner shielding electrode 6 located in an inner position and an outer shielding electrode 6 located in an outer position, respectively. The two shielding electrodes 6 are located on an insulating layer 32.

Also, two trap electrodes 7 are provided as an inner trap electrode 7 located in an inner position and as an outer trap electrode 7 located in an outer position, respectively. The two trap electrodes 7 are provided on an insulating layer 31. As seen in plan view, the inner trap electrode 7 is located inward of the inner shielding electrode 6. Also, as seen in plan view, the outer trap electrode 7 is located between the inner shielding electrode 6 and the outer shielding electrode 6.

<Twenty-sixth Embodiment>

Figure 33:
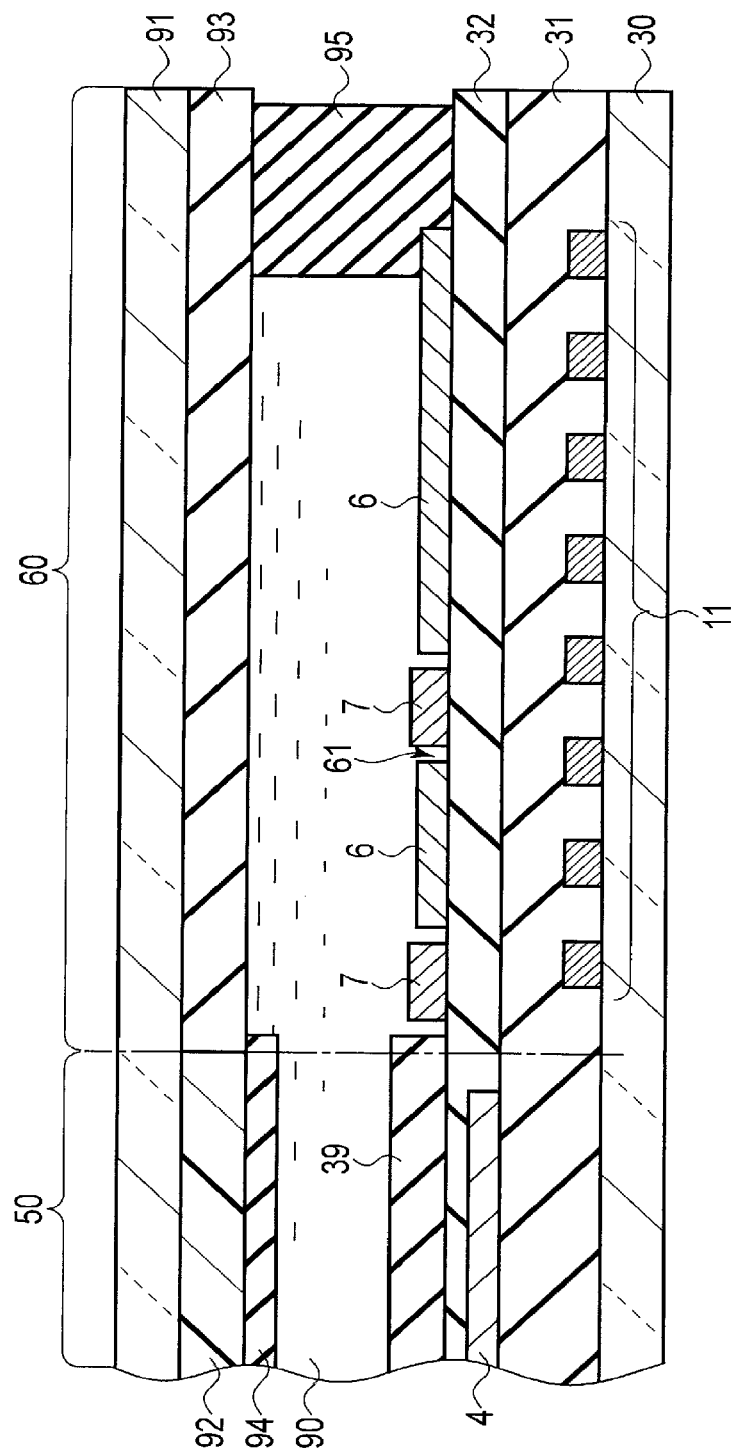
FIG. 33 is a cross-sectional view of a liquid crystal display device according to a twenty-sixth embodiment.

FIG. 33 is a cross-sectional view of a liquid crystal display device 100 according to the twenty-sixth embodiment. In this embodiment, two shielding electrodes 6 are provided as an inner shielding electrode 6 located in an inner position and an outer shielding electrode 6 located in an outer position, respectively. The two shielding electrodes 6 are located on an insulating layer 32.

Also, two trap electrodes 7 are provided as an inner trap electrode 7 located in an inner position and as an outer trap electrode 7 located in an outer position, respectively. The trap electrodes 7 are provided on an insulating layer 32. The inner trap electrode 7 is located inward of the inner shielding electrode 6. The outer trap electrode 7 is located between the inner shielding electrode 6 and the outer shielding electrode 6.

<Twenty-seventh Embodiment>

Figure 34:
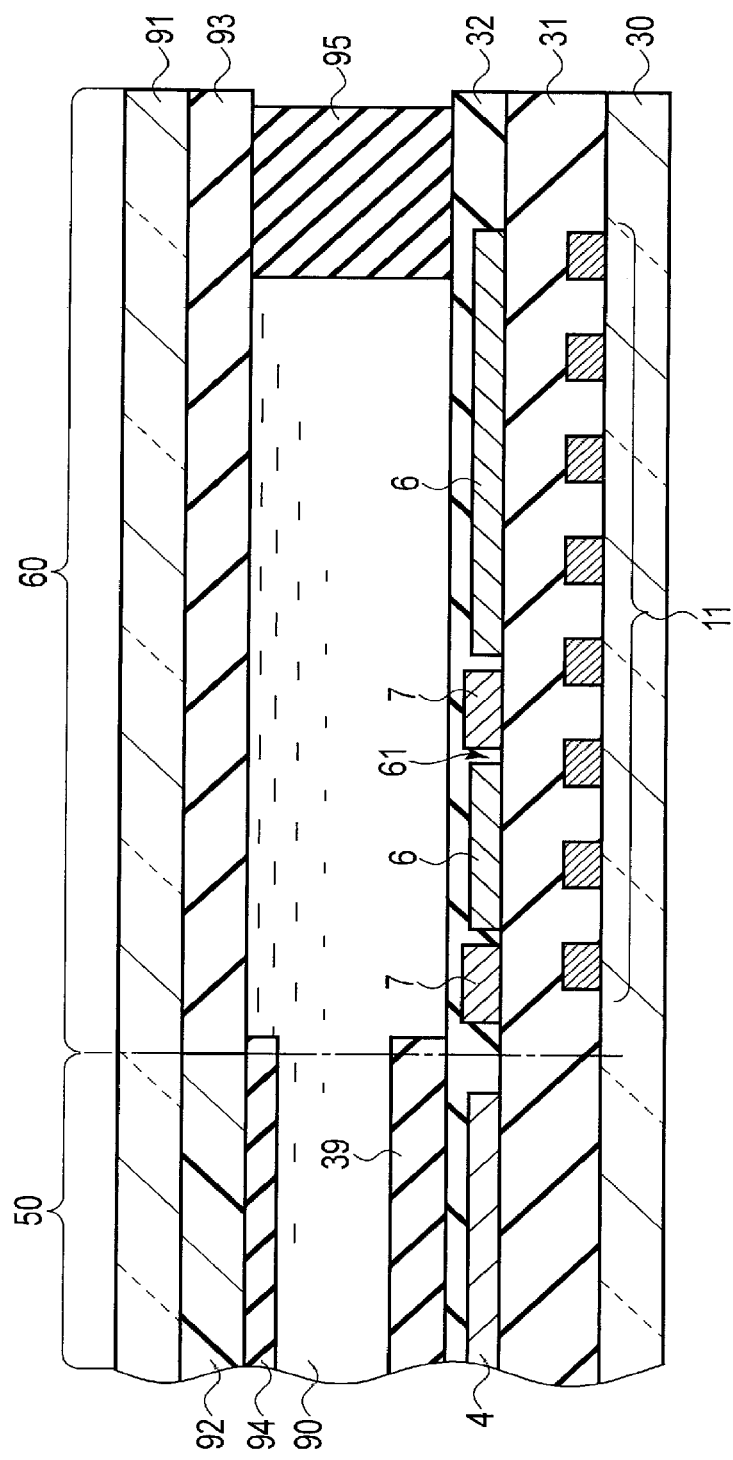
FIG. 34 is a cross-sectional view of a liquid crystal display device according to a twenty-seventh embodiment.

FIG. 34 is a cross-sectional view of a liquid crystal display device 100 according to the twenty-seventh embodiment. In this embodiment, two shielding electrodes 6 are provided as an inner shielding electrode 6 located in an inner position and an outer shielding electrode 6 located in an outer position, respectively. The two shielding electrodes 6 are located on an insulating layer 31.

Also, two trap electrodes 7 are provided as an inner trap electrode 7 located in an inner position and as an outer trap electrode 7 located in an outer position, respectively. The trap electrodes 7 are provided on an insulating layer 31. The inner trap electrode 7 is located inward of the inner shielding electrode 6. The outer trap electrode 7 is located between the inner shielding electrode 6 and the outer shielding electrode 6.

<Twenty-eighth Embodiment>

Figure 35:
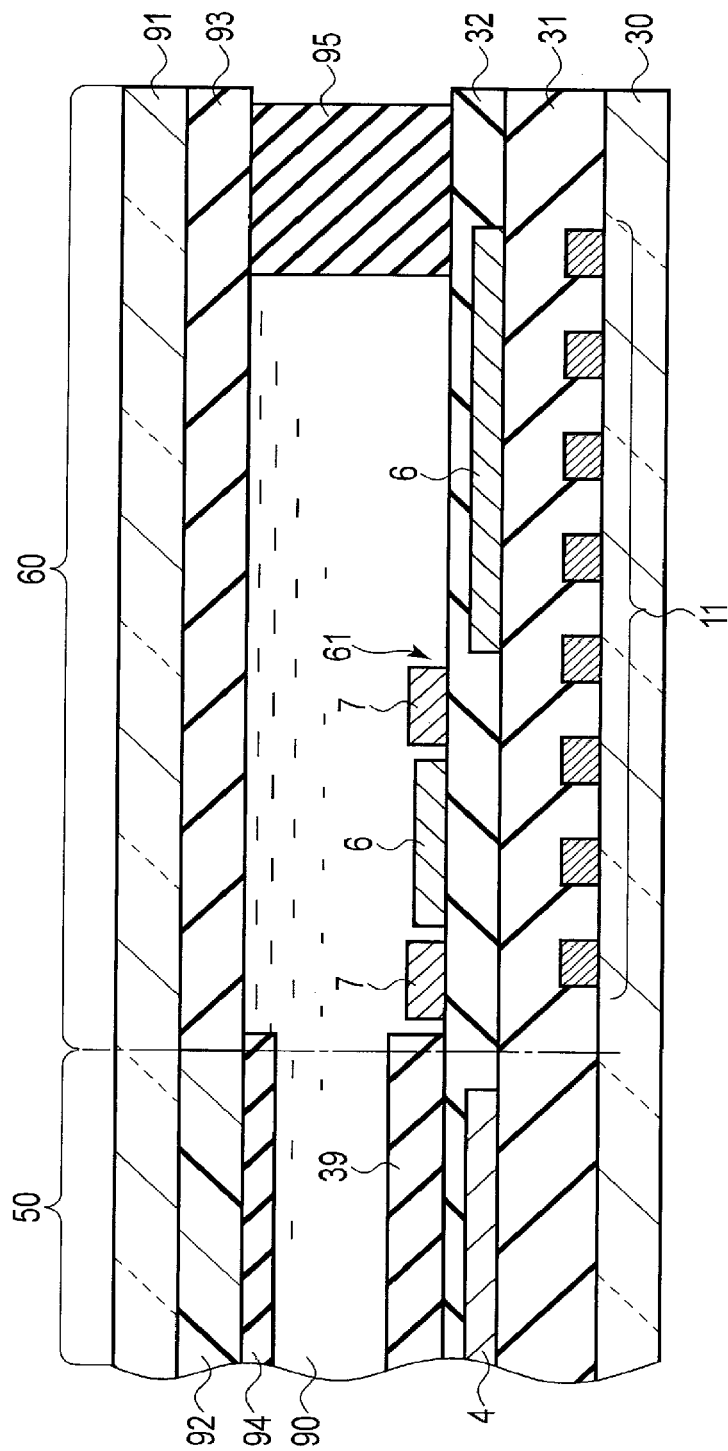
FIG. 35 is a cross-sectional view of a liquid crystal display device according to a twenty-eighth embodiment.

FIG. 35 is a cross-sectional view of a liquid crystal display device 100 according to the twenty-eighth embodiment. In this embodiment, two shielding electrodes 6 are provided as an inner shielding electrode 6 located in an inner position and an outer shielding electrode 6 located in an outer position, respectively. The inner shielding electrode 6 is located on an insulating layer 32. The outer shielding electrode 6 is located on an insulating layer 31.

Two trap electrodes 7 are provided as an inner trap electrode 7 in an inner position close to a display area 50 and as outer trap electrode 7 in an outer position, respectively. The two trap electrodes 7 are located on an insulating layer 32. As seen in plan view, the inner trap electrode 7 is located inward of the inner shielding electrode 6. Also, as seen in plan view, the outer trap electrode 7 is located between the inner shielding electrode 6 and the outer shielding electrode 6.

<Twenty-ninth Embodiment>

Figure 36:
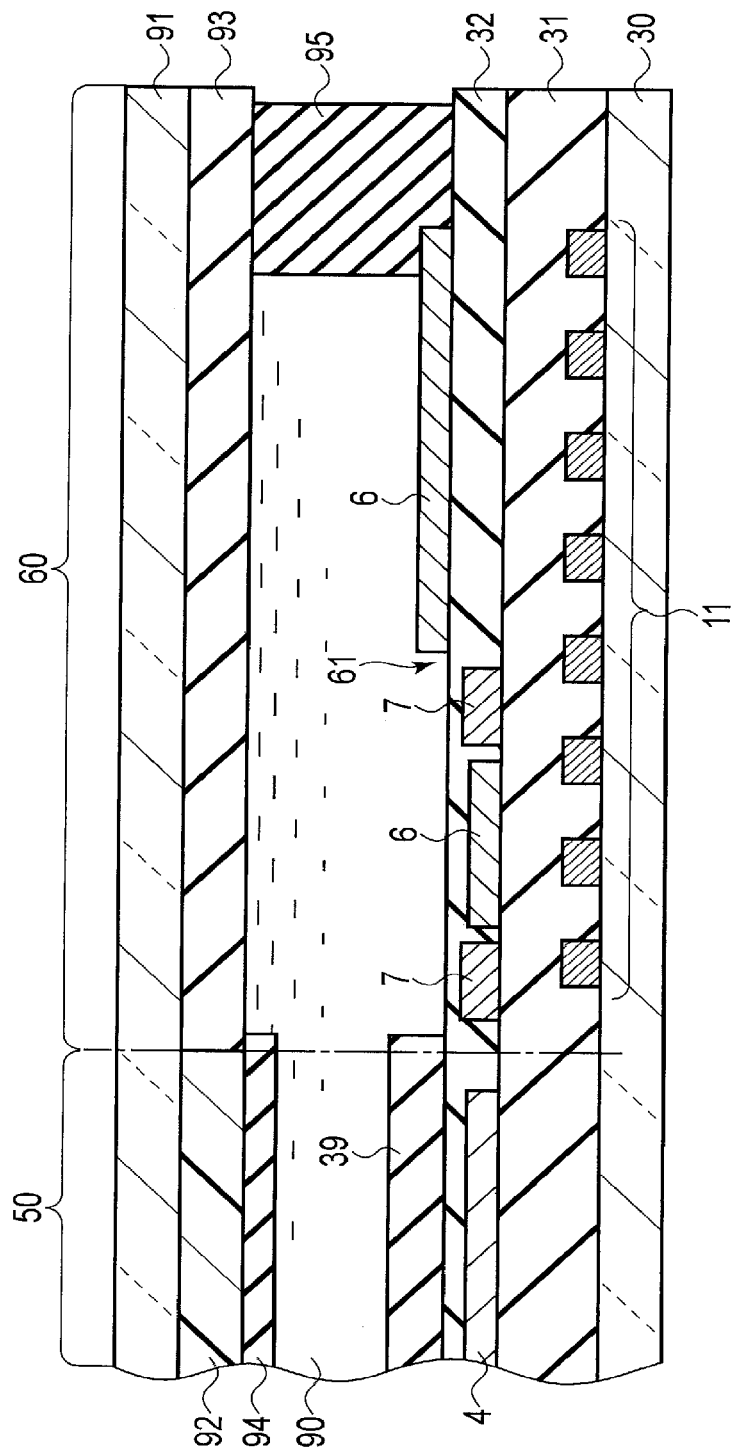
FIG. 36 is a cross-sectional view of a liquid crystal display device according to a twenty-ninth embodiment.

FIG. 36 is a cross-sectional view of a liquid crystal display device 100 according to the twenty-ninth embodiment. In this embodiment, two shielding electrodes 6 are provided as an inner shielding electrode 6 located in an inner position and an outer shielding electrode 6 located in an outer position, respectively. The inner shielding electrode 6 is provided on an insulating layer 31. The outer shielding electrode 6 is provided on an insulating layer 32.

Two trap electrodes 7 are provided as an inner trap electrode 7 located in an inner position close to a display area 50 and as outer trap electrode 7 located in an outer position, respectively. The two trap electrodes 7 are provided on an insulating layer 31. As seen in plan view, the inner trap electrode 7 is located inward of the inner shielding electrode 6. Also, as seen in plan view, the outer trap electrode 7 is located between the inner shielding electrode 6 and the outer shielding electrode 6.

<Thirtieth Embodiment>

Figure 37:
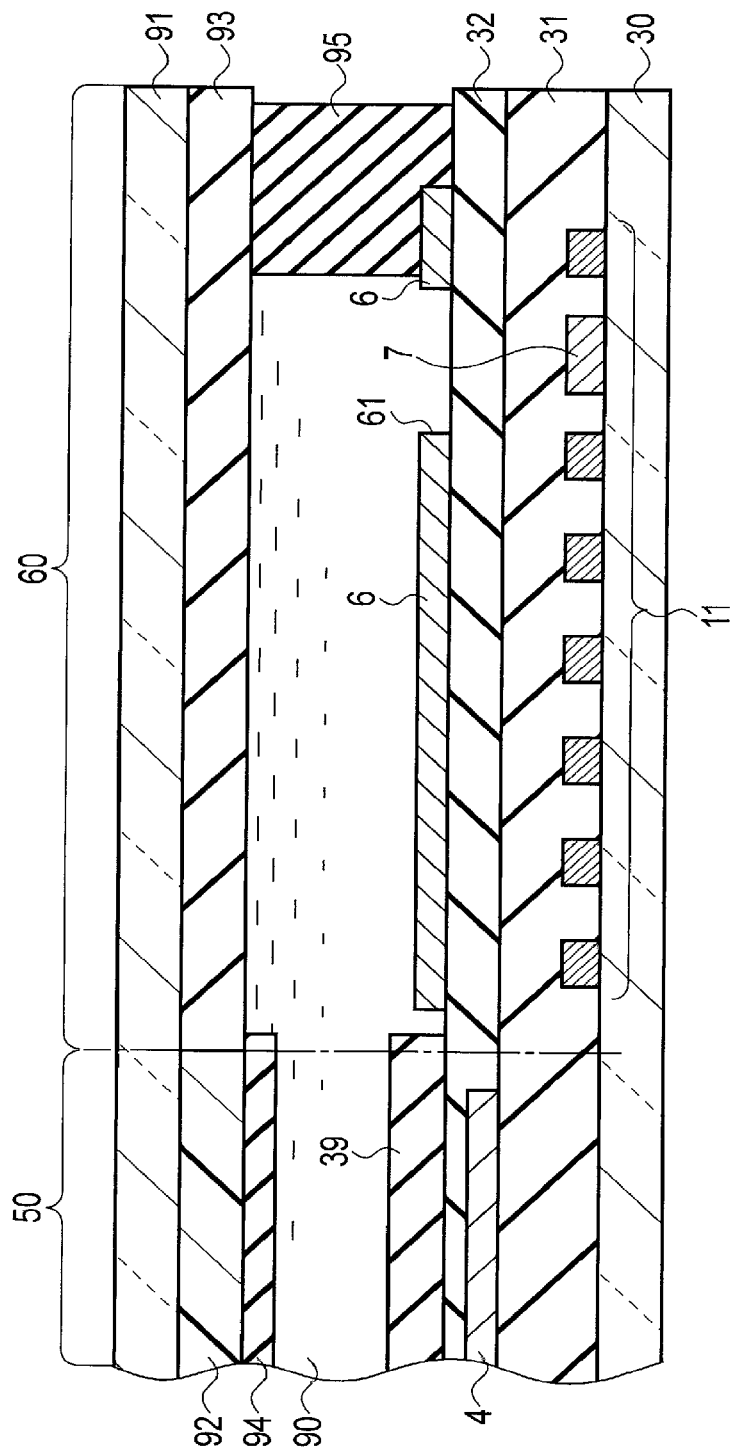
FIG. 37 is a cross-sectional view of a liquid crystal display device according to a thirtieth embodiment.

FIG. 37 is a cross-sectional view of a liquid crystal display device 100 according to the thirtieth embodiment. In this embodiment, a trap electrode 7 is provided in the same layer as scanning lines 11.

A shielding electrode 6 is provided in the same way as in the first embodiment. The trap electrode 7 is provided on a transparent substrate 30. The trap electrode 7 is located between scanning lines 11. It should be noted that the trap electrode 7 may be located inward of the scanning lines 11 or outward of the scanning lines 11.

The shielding electrode 6 is formed in the same shape as described with respect to an arbitrary one of all the embodiments. In this case, the trap electrode 7 is provided in the same layer as the scanning lines 11, and as seen in plan view, it is provided within a slit 61 formed in the shielding electrode 6 or between a plurality of shielding electrodes 6.

In such a manner, in the thirtieth embodiment, the trap electrode 7 is provided in the same layer as the scanning lines 11. Thereby, in the case of manufacturing the liquid crystal display device 100, the scanning lines 11 and the trap electrode 7 can be formed in a simple step.

<Thirty-first Embodiment>

Figure 38:
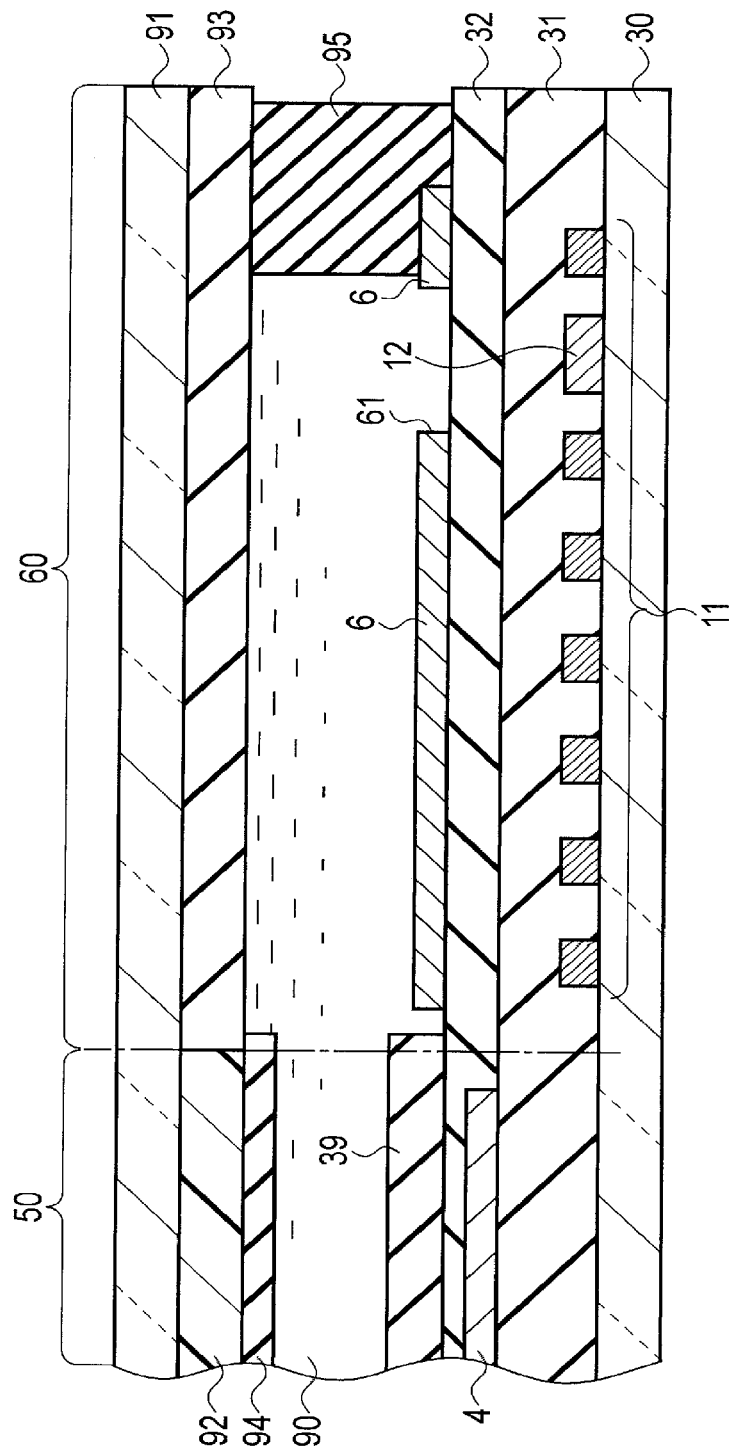
FIG. 38 is a cross-sectional view of a liquid crystal display device according to a thirty-first embodiment.

FIG. 38 is a cross-sectional view of a liquid crystal display device 100 according to the thirty-first embodiment. In this embodiment, one or more of scanning lines 11 each have an hourly average voltage lower than the voltage of the common electrode 4.

Furthermore, between the scanning lines 11, one or more low-voltage scanning lines 12 each having an hourly average voltage which is lower than the voltage of the common electrode 4 are provided. As seen in plan view, the low-voltage scanning line or lines 12 are located between an inner shielding electrode 6 and an outer shielding electrode 6.

In the thirty-first embodiment, the low-voltage scanning line or lines 12 trap ions. Thus, ions can be effectively kept out of a display area with a simple structure.

It should be noted that the shielding electrodes 6 may be formed in the same shape as described with respect to an arbitrary one of all the embodiments. In this case, as seen in plan view, the low-voltage scanning line or lines 12 are located within a slit 61 or slits 61 formed in the shielding electrodes 6 or between the shielding electrodes 6. That is, in place of the trap electrode or electrodes 7 in the above embodiments, the low-voltage scanning line or lines 12 are provided.

Also, it should be noted that in the thirty-first embodiment, the trap electrode 7 in the above embodiments may be further provided. In this case, in place of part of the trap electrode 7, a low-voltage scanning line 12 is provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   an active-element substrate having a display area and a non-display area;
   a counter-substrate provided above and opposite to the active-element substrate; and
   a liquid crystal provided between the active-element substrate and the counter-substrate,
   the active-element substrate including:
     an image signal line in the display area;
     an active element connected to the image signal line in the display area;
     a scanning line driving the active element and selectively supplied with a scanning high-voltage which turns on the active element and a scanning low-voltage which turns off the active element;
     a supplying voltage line supplied with the scanning low-voltage, the supplying voltage line and the scanning line being located on a same layer;
     a driving circuit which supplies a voltage to the image signal line and the scanning line;
     a pixel electrode;
     a common electrode driving the liquid crystal layer with the pixel electrode; and
     a first electrode having a slit, supplied with the same voltage as a voltage of the common electrode and provided in the non-display area,
   wherein
   the supplying voltage line is located in the slit of the first electrode in a plan view,
   the supplying voltage line and the scanning line are formed below a layer formed on the pixel electrode and a layer formed on the common electrode in the non-display area,
   a voltage supplied to the supplying voltage line is fixed to the scanning low-voltage in an image display, and
   a width of the supplying voltage line is greater than a width of the scanning line.

2. The liquid crystal display device of claim 1, further comprising
   a seal portion between the active-element substrate and the counter substrate,
   wherein the first electrode and the scanning line overlap with the seal portion.

3. The liquid crystal display device of claim 1, wherein the first electrode is made of Indium Tin Oxide.

4. The liquid crystal display device of claim 1, wherein the scanning line is located below the first electrode.

5. A liquid crystal display device comprising:
   an active-element substrate having a display area and a non-display area;
   a counter-substrate provided above and opposite to the active-element substrate; and
   a liquid crystal provided between the active-element substrate and the counter-substrate,
   the active-element substrate including:
     an image signal line in the display area;
     an active element connected to the image signal line in the display area;
     a scanning line driving the active element and selectively supplied with a scanning high-voltage which turns on the active element and a scanning low-voltage which turns off the active element;
     a supplying voltage line supplied with the scanning low-voltage, the supplying voltage line and the scanning line being located on a same layer;
     a driving circuit which supplies a voltage to the image signal line and the scanning line;
     a pixel electrode;
     a common electrode driving the liquid crystal layer with the pixel electrode; and
     a plurality of first electrodes supplied with the same voltage as a voltage of the common electrode and provided in the non-display area,
   wherein
   the supplying voltage line is located between the first electrodes in a plan view,
   the supplying voltage line and the scanning line are formed below a layer formed on the pixel electrode and a layer formed on the common electrode in the non-display area,
   a voltage supplied to the supplying voltage line is fixed to the scanning low-voltage in an image display, and
   a width of the supplying voltage line is greater than a width of the scanning line.

6. The liquid crystal display device of claim 5, further comprising
   a seal portion between the active-element substrate and the counter substrate,
   wherein one of the first electrodes and the scanning line overlap with the seal portion.

7. The liquid crystal display device of claim 5, wherein the plurality of first electrodes are made of Indium Tin Oxide.

8. The liquid crystal display device of claim 5, wherein the scanning line is located below the first electrode.

* * * * *